(12) United States Patent
Auray et al.

(10) Patent No.: US 8,350,163 B2
(45) Date of Patent: Jan. 8, 2013

(54) ELECTRICAL CONNECTOR HAVING SNAP IN FRUSTRO-CONICAL RETAINING RING WITH IMPROVED CONDUCTIVITY

(75) Inventors: Delbert Auray, Southport, CT (US); Kenneth M. Kiely, Milford, CT (US); Lawrence J. Smith, Stamford, CT (US)

(73) Assignee: Bridgeport, Fittings, Inc., Stratford, CT (US)

( * ) Notice: Subject to any disclaimer, the term of this patent is extended or adjusted under 35 U.S.C. 154(b) by 314 days.

(21) Appl. No.: 12/658,478

(22) Filed: Feb. 9, 2010

(65) Prior Publication Data

US 2010/0285699 A1 Nov. 11, 2010

Related U.S. Application Data

(63) Continuation-in-part of application No. 12/151,245, filed on May 5, 2008, now Pat. No. 7,820,922, which is a continuation-in-part of application No. 12/006,946, filed on Jan. 8, 2008, now Pat. No. 7,723,623, which is a continuation-in-part of application No. 11/903,410, filed on Sep. 21, 2007, now Pat. No. 7,952,034, which is a continuation-in-part of application No. 11/501,131, filed on Aug. 8, 2006, now Pat. No. 7,488,905, which is a continuation-in-part of application No. 11/403,099, filed on Apr. 12, 2006, now Pat. No. 7,151,223, which is a continuation-in-part of application No. 11/400,606, filed on Apr. 7, 2006, now Pat. No. 7,154,042, which is a continuation-in-part of application No. 11/364,435, filed on Feb. 28, 2006, now Pat. No. 7,205,489, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(51) Int. Cl.
*H02G 3/18* (2006.01)
*H02G 3/06* (2006.01)

(52) U.S. Cl. ........ 174/650; 174/666; 174/659; 174/656; 174/665; 439/557

(58) Field of Classification Search ................. 174/650, 174/665, 666, 659, 656, 68.1, 68.3, 72 C, 174/69, 71 R, 86, 657, 661, 70 R; 439/92, 439/142, 320, 557, 567, 552, 587; 403/197
See application file for complete search history.

(56) References Cited

U.S. PATENT DOCUMENTS 1,483,218 A 2/1924 Fahnestock
(Continued)

*Primary Examiner* — Angel R Estrada
(74) *Attorney, Agent, or Firm* — Fattibene and Fattibene; Paul A. Fattibene

(57) ABSTRACT

An electrical connector assembly having improved conductivity and continuity. A snap in or push in electrical connector having a zinc body and spring steel components plated with high conductivity metal, such as tin, providing a reduced voltage drop across the attached electrical connector. In an embodiment, a connector assembly has a connector body having opposed end openings provided with an outer surface that slopes downwardly toward the outlet opening. The inlet opening having placed therein cable retainer inserts. A sloping or frustro-conical, snap fit, snap in, or push in outer retaining ring with locking tangs is provided for snap locking the outlet end portion of the connector body to an electrical box or panel. Improved conductivity or continuity is obtained and a good electrical ground is formed between the electrical box and connector assembly.

18 Claims, 21 Drawing Sheets

U.S. PATENT DOCUMENTS

| | | |
|---|---|---|
| 1,725,883 A | 8/1929 | Recker |
| 1,830,250 A | 11/1931 | Tiefenbacher |
| 2,156,003 A | 4/1939 | Tinnerman |
| 2,160,353 A | 5/1939 | Conners |
| 2,445,663 A | 7/1948 | Peters |
| 2,744,769 A | 5/1956 | Roeder et al. |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |
| 3,788,582 A | 1/1974 | Swanquist |
| 3,814,467 A | 6/1974 | Van Buren, Jr. |
| 3,858,151 A | 12/1974 | Paskert |
| 3,993,333 A | 11/1976 | Biswas |
| 4,012,578 A | 3/1977 | Moran et al. |
| 4,021,604 A | 5/1977 | Dola et al. |
| 4,032,178 A | 6/1977 | Neuroth |
| 4,248,459 A | 2/1981 | Pate et al. |
| 4,361,302 A | 11/1982 | Lass |
| 4,468,535 A | 8/1984 | Law |
| 4,619,332 A | 10/1986 | Sheehan |
| 4,621,166 A | 11/1986 | Neuroth |
| 4,626,620 A | 12/1986 | Plyler |
| 4,657,212 A | 4/1987 | Gilmore et al. |
| 4,711,472 A | 12/1987 | Schnell |
| 4,773,280 A | 9/1988 | Baumgarten |
| 4,880,387 A | 11/1989 | Stikeleather et al. |
| 4,981,310 A | 1/1991 | Belisaire |
| 4,990,721 A | 2/1991 | Sheehan |
| 5,132,493 A | 7/1992 | Sheehan |
| 5,171,164 A | 12/1992 | O'Neil et al. |
| 5,189,258 A | 2/1993 | Pratesi |
| 5,266,050 A | 11/1993 | O'Neil et al. |
| 5,342,994 A | 8/1994 | Pratesi |
| 5,422,437 A | 6/1995 | Schnell |
| 6,034,326 A | 3/2000 | Jorgensen |
| 6,043,432 A | 3/2000 | Gretz |
| 6,080,933 A | 6/2000 | Gretz |
| 6,114,630 A | 9/2000 | Gretz |
| 6,133,529 A | 10/2000 | Gretz |
| 6,194,661 B1 | 2/2001 | Gretz |
| 6,335,488 B1 | 1/2002 | Gretz |
| 6,352,439 B1 | 3/2002 | Stark et al. |
| 6,355,884 B1 | 3/2002 | Gretz |
| 6,380,483 B1 | 4/2002 | Blake |
| 6,444,907 B1 | 9/2002 | Kiely |
| 6,476,322 B1 | 11/2002 | Dunne et al. |
| 6,521,831 B1 | 2/2003 | Gretz |
| 6,555,750 B2 | 4/2003 | Kiely |
| 6,604,400 B1 | 8/2003 | Gretz |
| 6,670,553 B1 | 12/2003 | Gretz |
| 6,682,355 B1 * | 1/2004 | Gretz ............................ 174/663 |
| 6,709,280 B1 | 3/2004 | Gretz ............................ 439/92 |
| 6,737,584 B2 | 5/2004 | Kiely |
| 6,768,057 B2 | 7/2004 | Blake |
| 6,780,029 B1 | 8/2004 | Gretz |
| 6,849,803 B1 | 2/2005 | Gretz |
| 6,860,758 B1 | 3/2005 | Kiely |
| 6,872,886 B2 | 3/2005 | Kiely |
| 6,916,988 B1 | 7/2005 | Auray et al. |
| 7,060,900 B1 * | 6/2006 | Gretz ............................ 174/666 |
| 7,154,054 B1 | 12/2006 | Gretz ............................ 174/655 |
| 7,161,095 B1 | 1/2007 | Gretz ............................ 174/655 |
| 7,214,890 B2 * | 5/2007 | Kiely et al. ................... 174/666 |
| 7,226,309 B1 | 6/2007 | Gretz ............................ 439/460 |
| 7,238,894 B1 | 7/2007 | Gretz ............................ 174/655 |
| 7,432,452 B2 * | 10/2008 | Gardner ........................ 174/650 |

\* cited by examiner

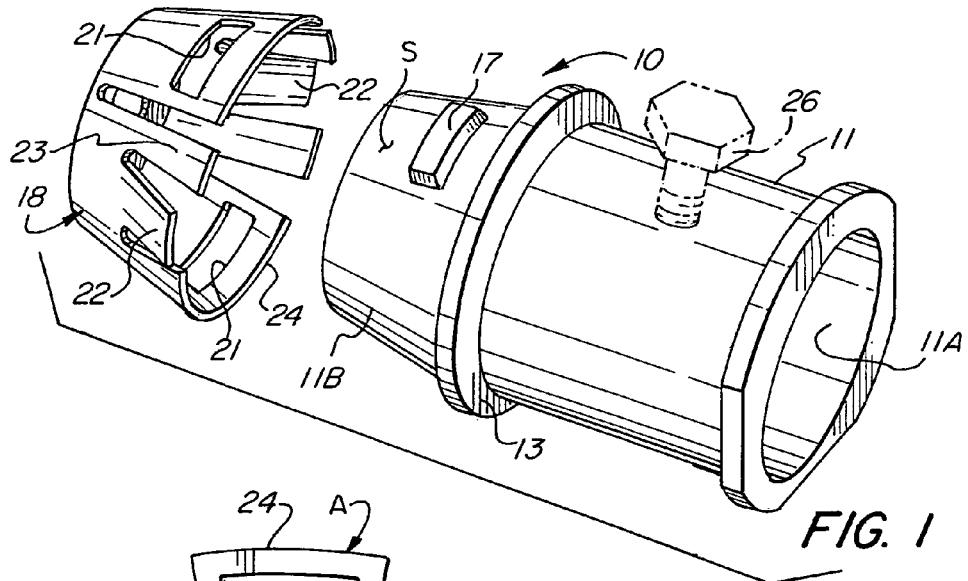
FIG. 1
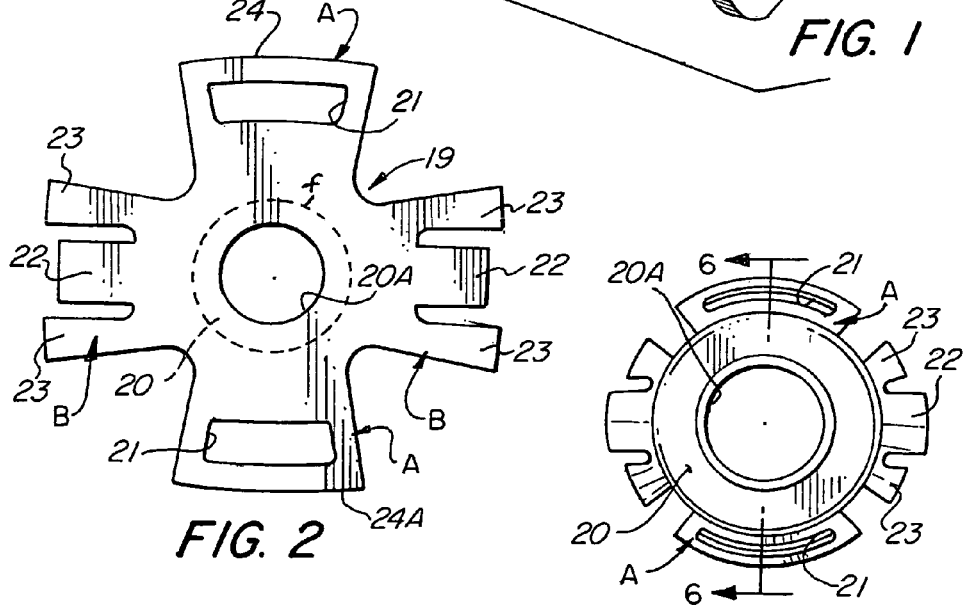
FIG. 2
FIG. 3
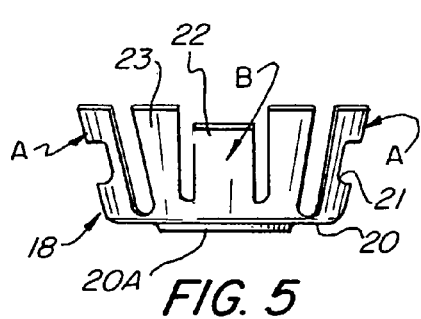
FIG. 5
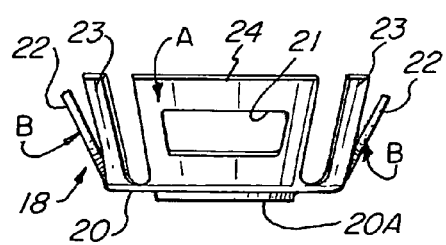
FIG. 4

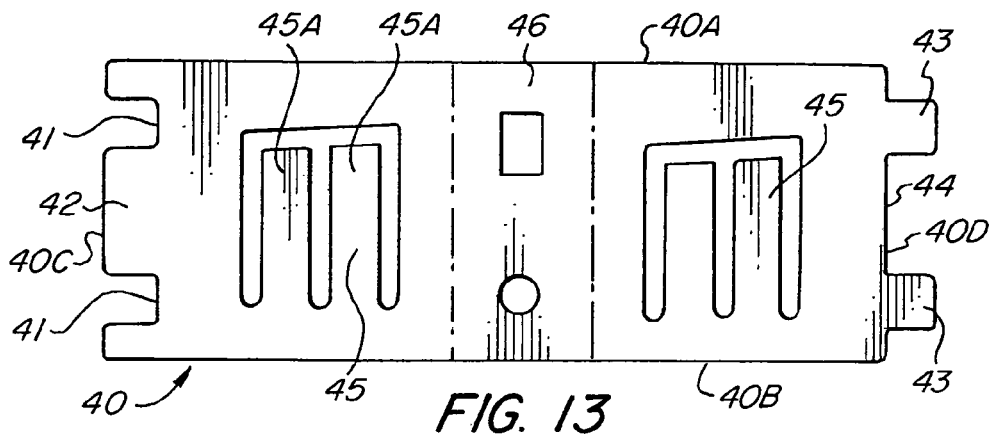
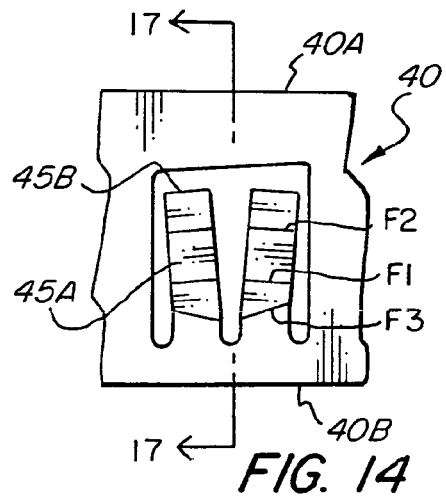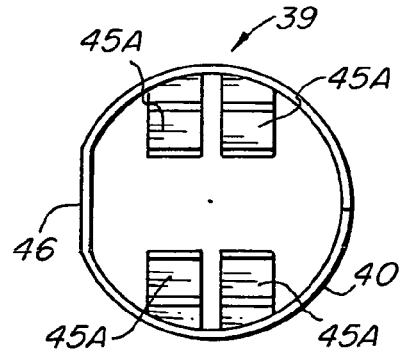
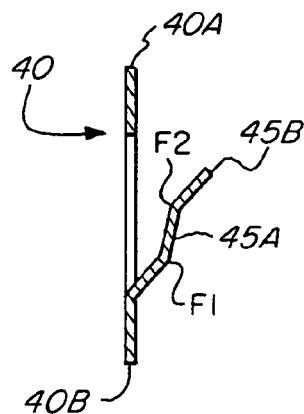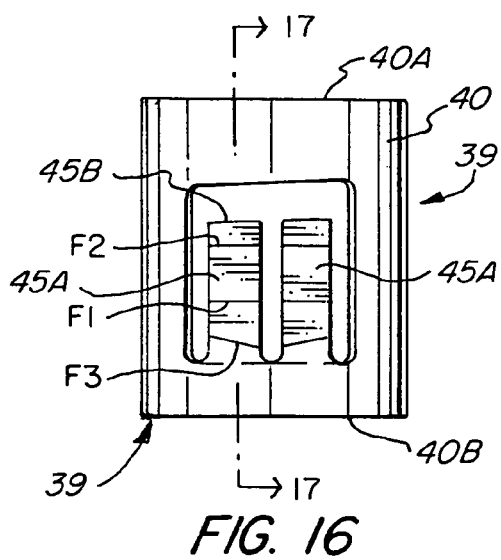

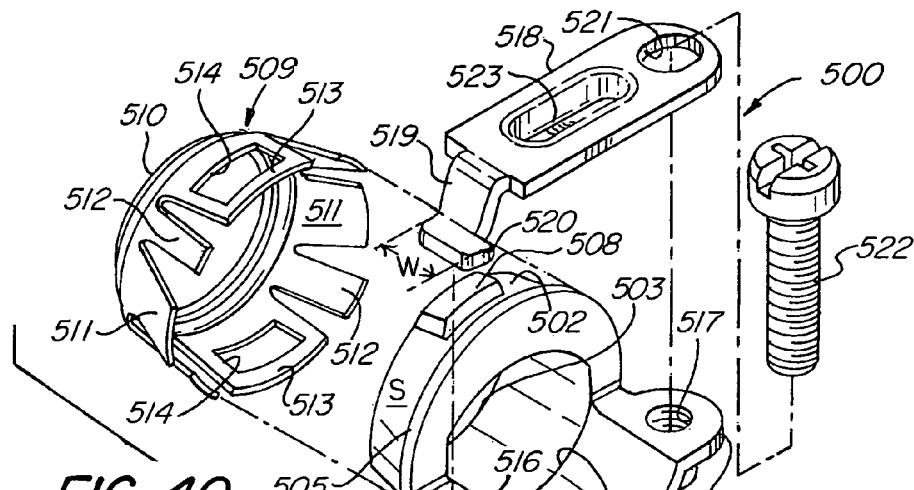
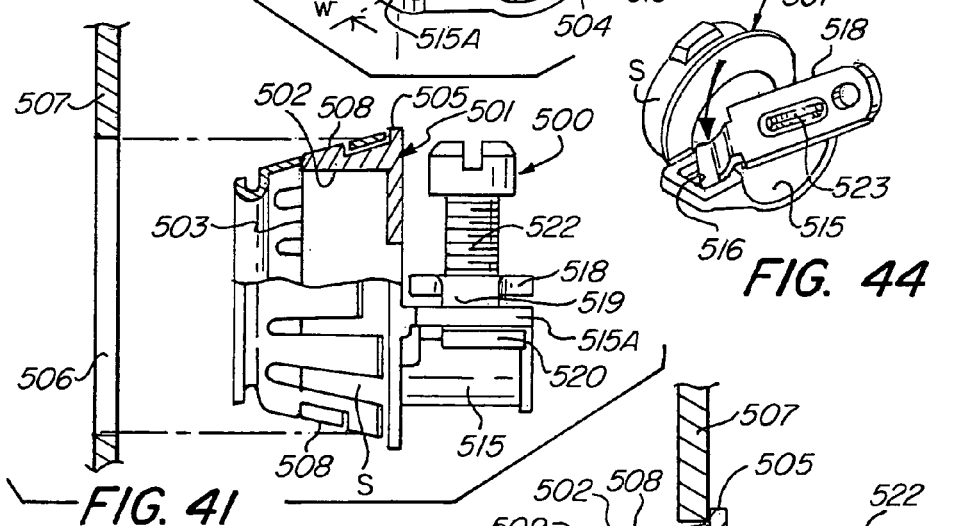
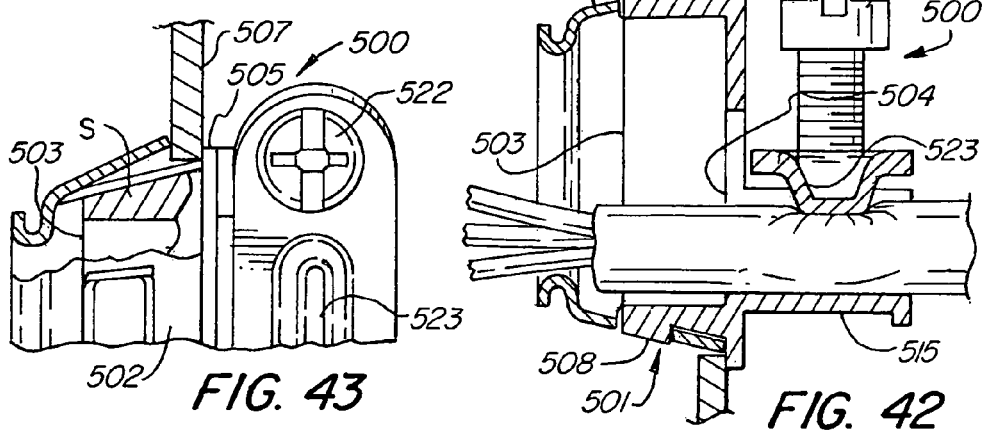

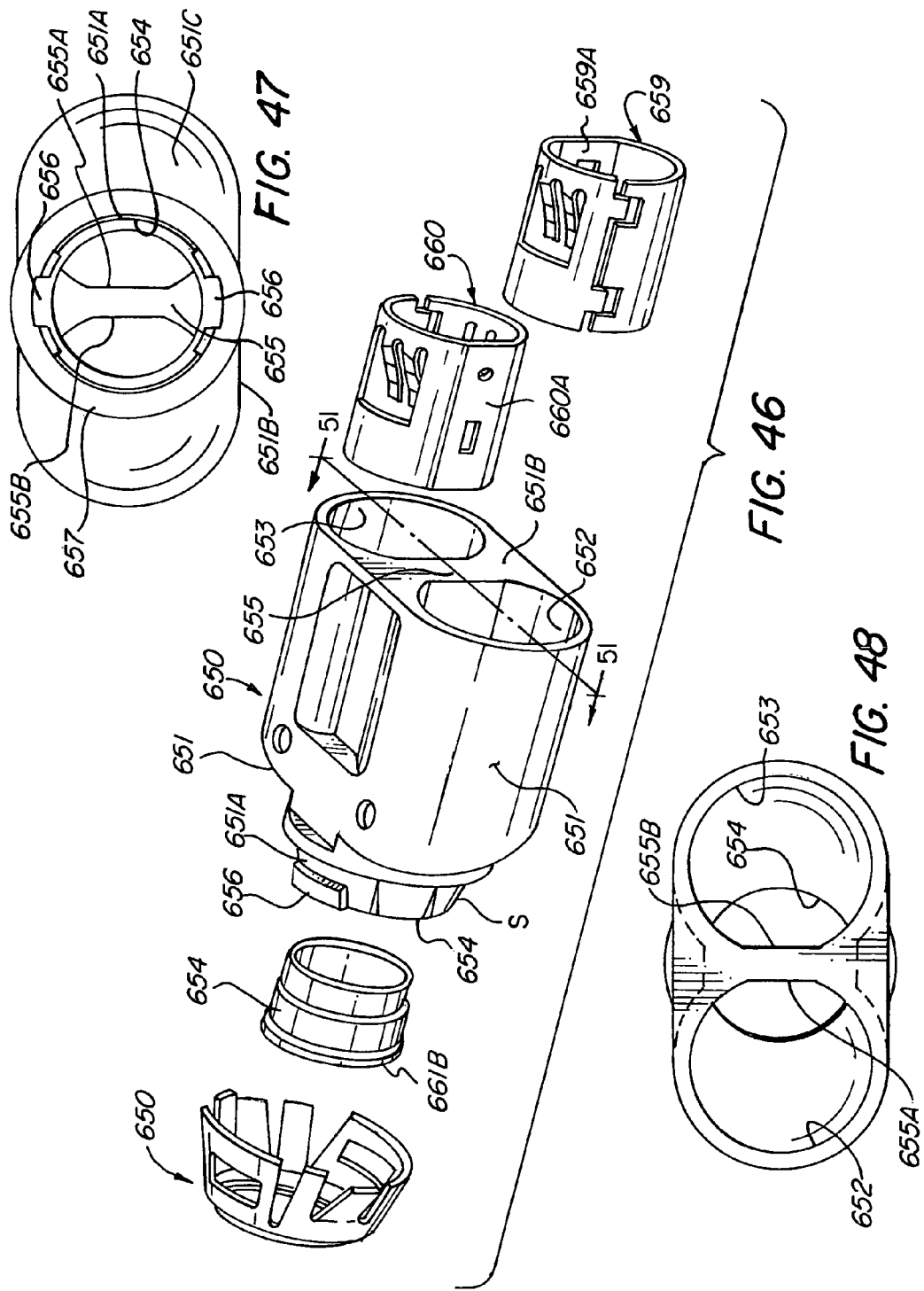

ELECTRICAL CONNECTOR HAVING SNAP IN FRUSTRO-CONICAL RETAINING RING WITH IMPROVED CONDUCTIVITY

RELATED APPLICATIONS

This application is a continuation in part of application Ser. No. 12/151,245 filed May 5, 2008 now U.S. Pat. No. 7,820,992, which is a continuation in part of application Ser. No. 12/006,946 filed Jan. 8, 2008 now U.S. Pat. No. 7,723,623, which is a continuation in part of application Ser. No. 11/903,410 filed Sep. 21, 2007 now U.S. Pat. No. 7,952,034, which is a continuation in part of application Ser. No. 11/501,131 filed Aug. 8, 2006, now U.S. Pat. No. 7,488,905, which is a continuation in part of application Ser. No. 11/403,099 filed Apr. 12, 2006, now U.S. Pat. No. 7,151,223, which is a continuation in part of application Ser. No. 11/400,606 filed Apr. 7, 2006, now U.S. Pat. No. 7,154,042, which is a continuation in part of application Ser. No. 11/364,435 filed Feb. 28, 2006, now U.S. Pat. No. 7,205,489, which is a continuation in part of application Ser. No. 11/258,990 filed Oct. 26, 2005, now U.S. Pat. No. 7,057,107, which is a continuation in part of application Ser. No. 11/151,374 filed Jun. 13, 2005, now U.S. Pat. No. 7,075,007, which is a continuation in part of application Ser. No. 11/100,250 filed Apr. 6, 2005, now U.S. Pat. No. 7,064,272, which is a continuation in part of application Ser. No. 10/939,619 filed Sep. 13, 2004, now U.S. Pat. No. 6,916,988, each of which is herein incorporated by reference.

FIELD OF THE INVENTION

This invention is directed to a further advancement in the field of electrical connector assemblies having a snap fit retaining ring circumscribing an outlet end of a connector body for effecting a snap fit or snap in connection to an electrical box. More specifically, this invention is directed to further improvements in electrical connector assemblies providing improved continuity or conductivity.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box or panel. Such known electrical connectors are either of a type that are secured to an electric box by a threaded lock nut or by means of a conventional circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement.

Also known are connectors formed as connector caps which are adapted to be fitted over the end of a conductor, cable or wires, such as disclosed in U.S. Pat. No. 4,880,387. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803.

Notwithstanding the extensive background relating to electrical connectors, continuing efforts are being made to improve, simplify and/or reduce the cost and/or complexity of the known connectors in an effort to advance the electrical connector art. This disclosure is directed to such efforts.

In particular, difficulties have arisen with electrical connectors that snap-fit or push-in to electrical boxes. Often due to the reduced contact surface area there is reduced continuity or conductivity between the electrical connector and electrical box or junction box. Therefore, there may be inadequate bonding or grounding or a voltage drop across the connected electrical connector that may be excessive or higher than industrial standards would permit. Typically, snap-fit or push-in electrical connectors have portions that are made of spring steel that are plated with zinc or zinc alloy for corrosion resistance. The bodies of electrical connectors are typically cast from a zinc alloy. Due to the different contact points in a snap-fit or push-in electrical connector electrical continuity may be affected and substantially reduced. In some snap-fit or push-in electrical connectors industrial standards related to permissible voltage drop across the electrical connector may not be met.

Efforts have been made to improve continuity in snap-fit or push-in electrical connectors. Nearly all of these efforts have been directed to increasing contact surface area. For example, U.S. Pat. No. 6,709,280 entitled "Fitting with Improved Continuity" issuing Mar. 23, 2004 to Gretz. Therein disclosed is a fitting for connecting a cable to an electrically conducting junction box having a sloped grounding tang in which the downward slope causes the fitting to be drawn tightly against the junction box wall. Another fitting is disclosed in U.S. Pat. No. 6,780,029 entitled "High Continuity Electrical Fitting" issuing Aug. 24, 2004 to Gretz. Therein disclosed is a fitting for connecting a cable to an electrically conducting junction box that has larger grounding tangs providing much greater surface contact area, thereby improving continuity and lowering millivolt drop.

While these prior techniques improve continuity they have done so by increasing surface area contact. While this may provide some improvement in continuity, there is a limit to the increase surface area contact that can be obtained in an electrical connector or fitting. Therefore, there is a need for a different approach in obtaining improved continuity or conductivity between the electrical conductor or fitting, the electrical box, and the cable.

SUMMARY OF THE INVENTION

The present invention provides for improved electrical continuity and conductivity between the electrical fitting or connector, the electrical box or junction box, and the metal conduit or cable. Electrical connectors having spring metal steel parts used for a snap-in or push-in connection are plated with a metal or alloy having high conductivity, such as tin or a tin alloy.

In a snap-in electrical connector, the outlet end portion of the connector body is provided with an outer surface that converges or tapers inwardly toward the outlet opening thereof. Formed on the surface of the opposed end portions are one or more retaining lugs, which may be circumferentially spaced about the end opening and a frustro-conically shaped, snap-fit retainer is fitted onto and secured to the outlet end portion of the connector body. The frustro-conical outer retainer is formed from a blank of sheet material, e.g. spring steel or the like, having a cruciform shape that includes a face portion or simply a central opening wherein the radiating arms of the cruciform blank are disposed about the face portion or central opening to define a frustro-conical shaped cup or ring. The frustro-conical shaped cup or ring so formed is provided with blanked out or die cut tangs to define outwardly bent locking tangs and bonding or grounding tangs. The trailing edge and bonding or grounding tangs of the frustro-conical ring or cup provides for electrical bonding or grounding in the assembled position of the electrical connector to an electric box or panel.

The frustro-conical outer retainer so formed from the frustro-conical ring or cup also has a slot adapted to receive a retaining lug when the frustro-conical cup or ring is fitted onto the outlet end portion of the connector body whereby the free or trailing edge of the frustro-conical ring or cup define a bonding or grounding edge or tang that engages the inner periphery of the knockout hole of an associated electric box or panel for effecting positive electrical continuity or bonding or grounding therebetween.

To form the frustro-conical ring or cup, the cruciform arms are arranged to be folded relative to the central opening or face forming portion that circumscribes the central opening, to define a unitary frustro-conically shaped cup-like member or ring to compliment or be fitted onto the outlet end portion of the connector body. The frustro-conical outer retainer thus formed is fitted over or onto the outlet end portion of the connector body so that the retaining slot formed in the frustro-conical outer retainer is adapted to receive the complementary retaining lug formed on the surface of the outlet end portion of the connector body for retaining or securing the frustro-conical outer retainer on the outlet end portion.

With the construction described, the outlet end portion of the electrical connector assembly can be readily inserted through the knockout hole of an electric box wherein the locking tangs will initially be flexed inwardly to pass through the knockout hole of an electric box, and then spring outwardly to lock the electrical connector assembly to the electric box or electric support panel with the trailing or bonding or grounding edge or tang of the frustro-conical outer retainer being inherently biased so as to be urged against the internal periphery of the knockout hole due to the frustro-conical configuration and inherent resiliency of the bonding or grounding edge or tang to effect a positive electric ground as a result thereof.

Accordingly, it is an object of the present invention to provide an electrical connector that has improved electrical bonding or grounding properties.

It is another object of the present invention to provide an electrical connector with improved continuity.

It is an advantage of the present invention that a reduced voltage drop across the connected electrical connector is obtained improving electrical performance of the electrical connector.

It is another advantage of the present invention that tin plating provides corrosion resistance.

It is a feature of the present invention that a plating of high electrical conductivity material is formed on snap-in or push-in spring steel or metal portions of the electrical connector.

It is another feature of the present invention that the high electrical conductivity material is plated on all surfaces of the snap-in or push-in spring steel or metal portions.

It is yet another feature of the present invention that the high electrical conductivity material plated on the snap-in or push-in spring steel or metal portions is preferably tin, tin alloy, silver, gold, or other high electrical conductivity material.

It is another feature of the present invention that a frustro-conical outer retainer is used having a leading edge, a trailing edge and an intermediate portion therebetween and having an integrally formed outwardly sprung locking tang that can be readily connected to a knockout hole of an electric box, panel or enclosure with a snap-fit wherein the trailing edge of the frustro-conical outer retainer functions to enhance the electrical ground between the electrical box and the connector body.

Another object of this invention is to provide for an electrical connector assembly that includes an electrical connector body having an outlet end opening having a frustro-conical outer surface for receiving thereon a complementary frustro-conical outer retainer that is readily fitted to and retained about the outlet end opening of the outlet end portion of the connector body.

Another object of the present invention is to provide an electrical connector assembly that is relatively simple to fabricate, positive in operation, and economical to produce and sell.

These and other objects, advantages, and features will become readily apparent in view of the following more detailed description.

BRIEF DESCRIPTION OF THE DRAWINGS

FIG. 1 is an exploded perspective view of an electrical connector assembly.

FIG. 2 is a plan view of the blank from which the outer retaining ring of the present invention is formed.

FIG. 3 is a detail front view of the outer retainer ring.

FIG. 4 is a detail top plan view of the outer retainer ring of FIG. 3.

FIG. 5 is a detail view of FIG. 4 rotated 90°.

FIG. 13 is a top plan view of the blank from which the internal wire conductor retainer is formed.

FIG. 14 is a fragmentary top view of a portion of the blank forming the inner retainer sleeve or ring.

FIG. 15 is an end view of the inner wire conductor retainer ring or sleeve.

FIG. 16 is a top view of the inner retainer ring or sleeve of FIG. 15.

FIG. 17 is a section view taken along-17-17 on FIG. 16.

FIG. 40 is an exploded perspective view of another embodiment of the invention.

FIG. 41 is a partially exploded side view of the embodiment of FIG. 40 having parts shown in section.

FIG. 42 is a side sectional view of the embodiment of FIG. 41 showing the connector assembly attached to a knockout hole of an electric box or panel.

FIG. 43 is a fragmentary side view similar to FIG. 42 rotated 90° to illustrate the locking position of the locking tangs relative to an electric box or panel.

FIG. 44 is a detail perspective view illustrating the assembly of hinging the clamping strap to the support saddle.

FIG. 46 is an exploded perspective view of a modified duplex connector embodying the invention.

FIG. 47 is the front or outlet end view of the duplex connector body of FIG. 46.

FIG. 48 is the rear or inlet end view of the duplex connector body of FIG. 46.

DETAILED DESCRIPTION OF THE PREFERRED EMBODIMENTS

Figure 6:
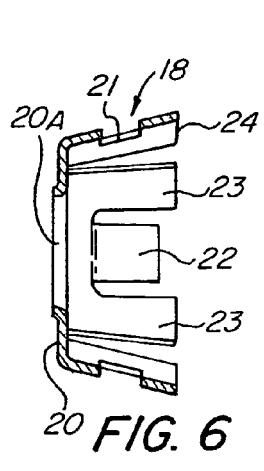
FIG. 6 is a sectional view of the outer retainer ring taken along line 6-6 on FIG. 3.

Referring to the drawings, there is shown in FIG. 1 an electrical connector assembly 10. The connector assembly 10 includes a connector body 11, which is usually formed as a metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box or panel 15, as noted in FIG. 8.

Figure 8:
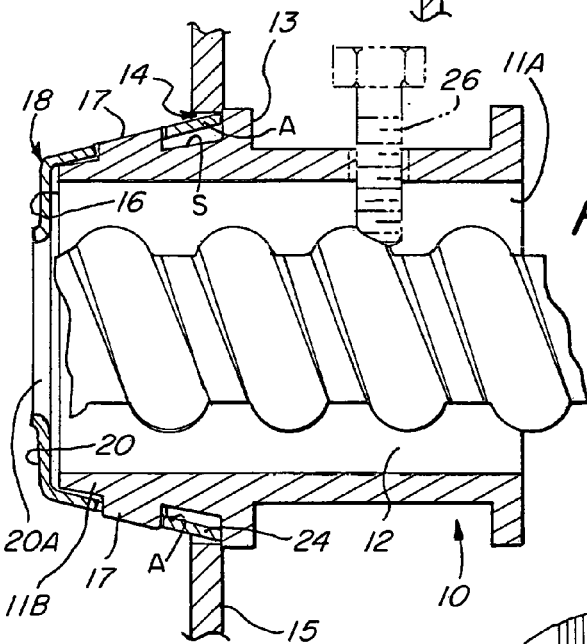
FIG. 8 is a section side view illustrating the connector assembly secured to an electric box, taken along line 8-8 on FIG. 10.
Figure 10:
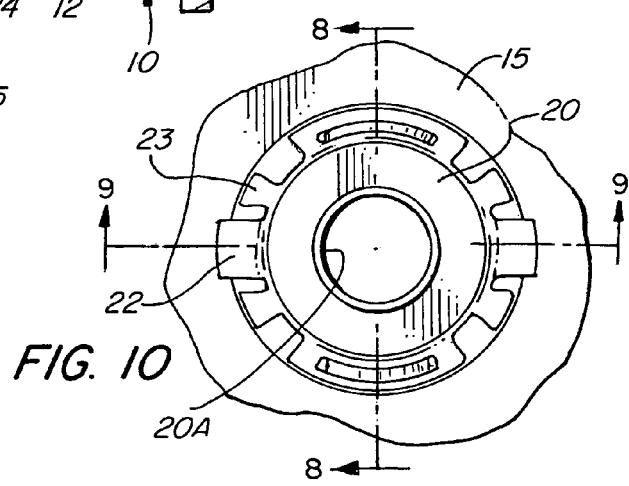
FIG. 10 is a fragmentary front view of the connector assembly secured to an electric box as viewed from the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
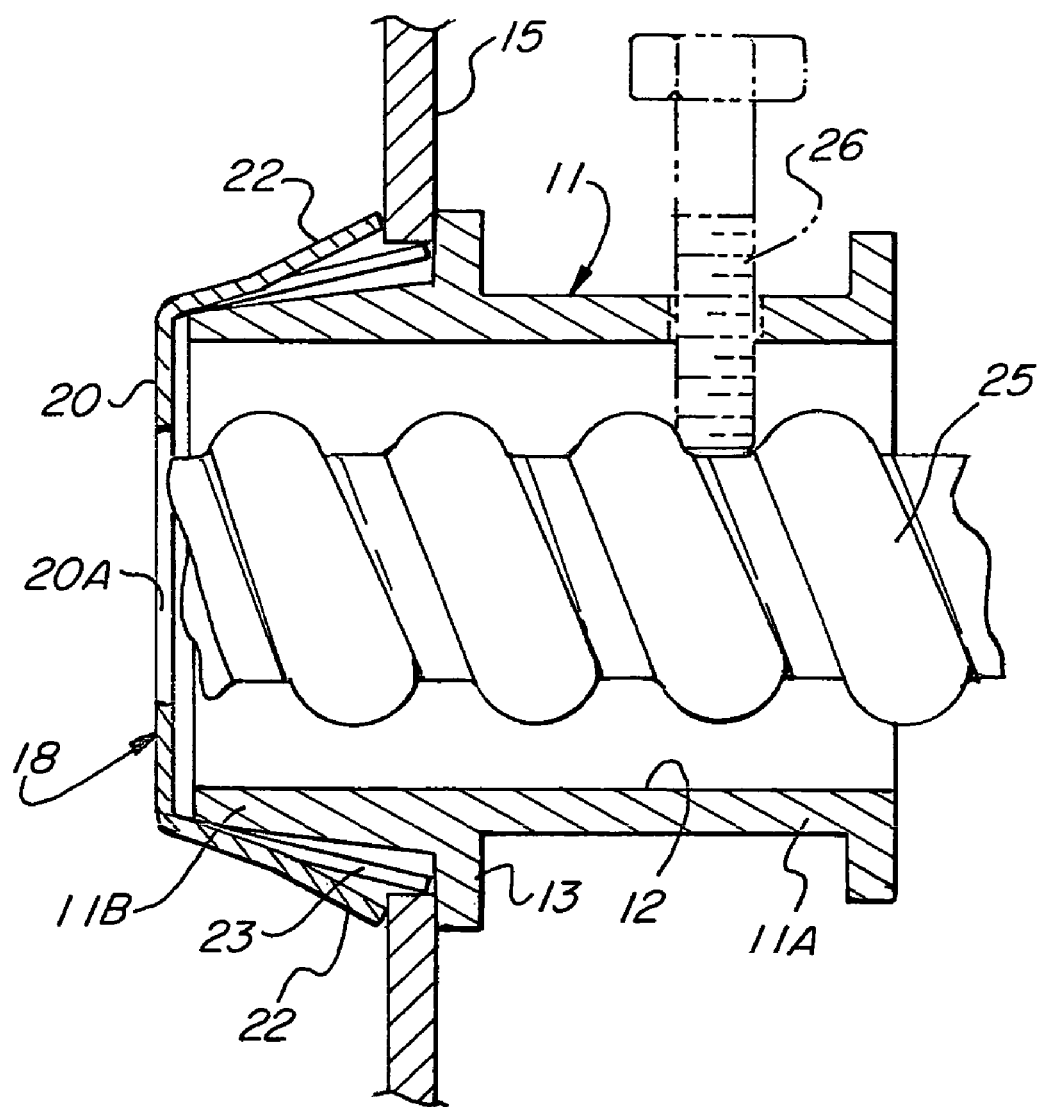
FIG. 9 is a sectional view taken along line 9-9 on FIG. 10 and rotated 90°.
Figure 11:
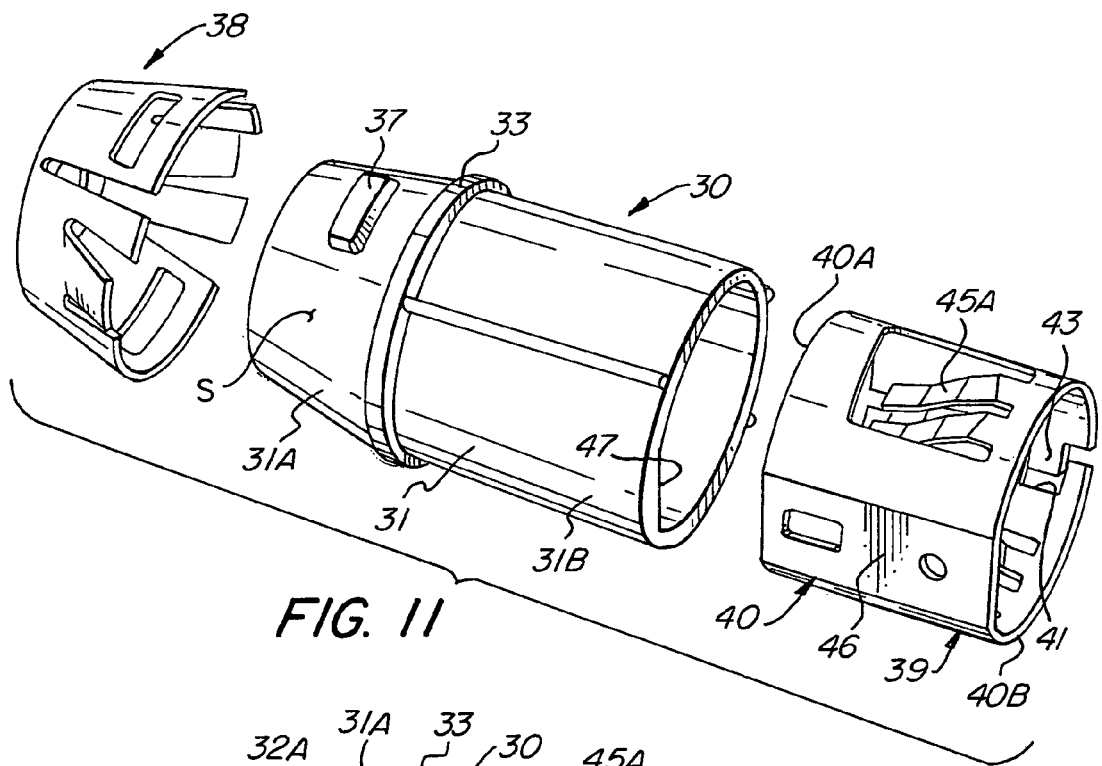
FIG. 11 is an exploded perspective view of a modified form of the invention.
Figure 12:
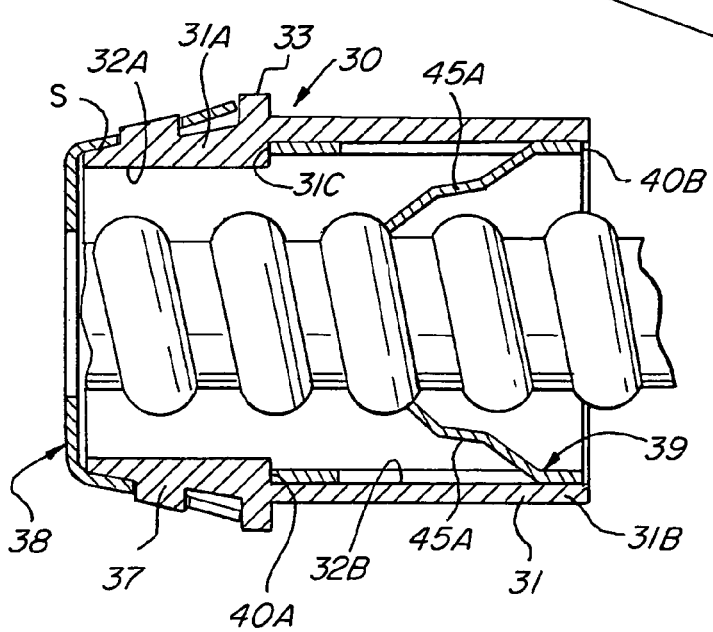
FIG. 12 is a sectional side view of the modified form of the invention of FIG. 11.
Figure 18:
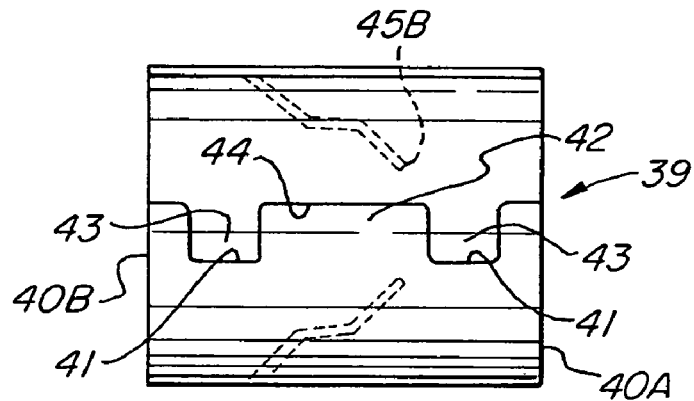
FIG. 18 is a side view of the inner retainer ring or sleeve.
Figure 19:
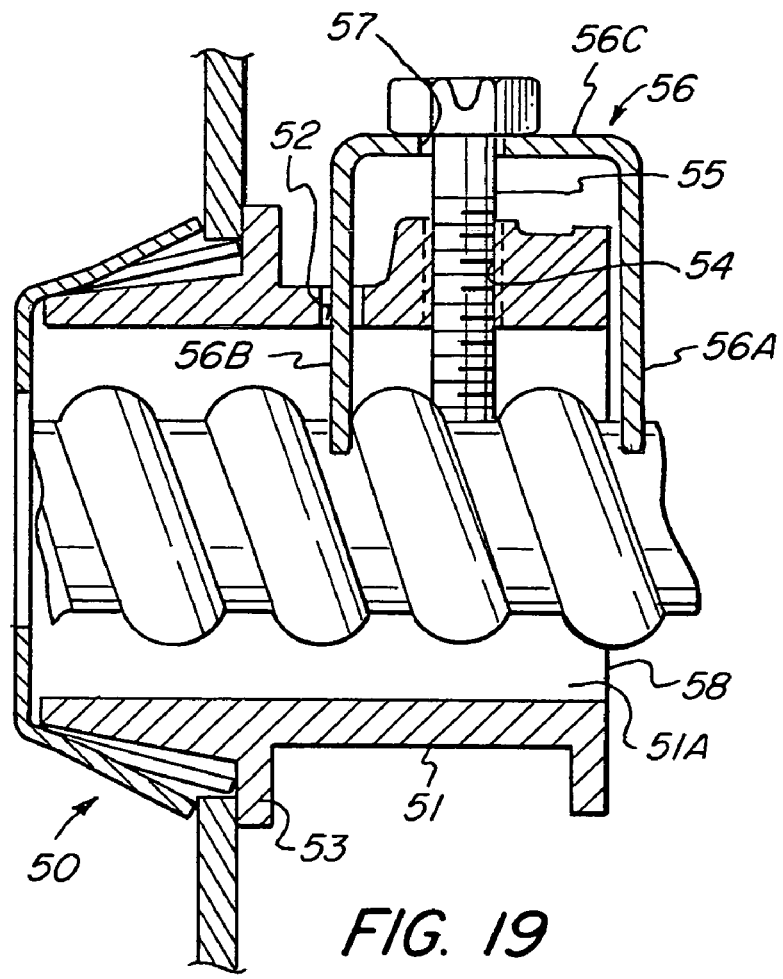
FIG. 19 is a sectional side view of still another embodiment.

As illustrated in FIG. 2, the opposed pair of arms AA are each provided with a retaining slot 21. The opposed pair of arms BB, as best seen in FIGS. 2 and 9, are blanked or formed to define a locking tang 22 and to either side thereof the trailing edge of the retaining ring defines an electrical bonding or grounding tang 23, 23. As shown, the locking tang 22 is slightly shorter than the adjacent bonding or grounding tangs 23, 23. The arrangement is such that the free end of the locking tangs 22 are sprung outwardly and formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends or trailing edges of the frustro-conical ring define the bonding or grounding tangs 23 that are biased in engagement with the internal periphery of the knockout hole 14. Also, the free edge or end 24A of arms A,A in the assembled position will also function as electrical bonding or grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are cantileverly and outwardly bent or displaced relative to the surface of the frustro-conical ring at a slightly greater outwardly angle or slope than the adjacent bonding or grounding edge or tangs 23 and the slope of arms A,A. With the retaining ring 18 so formed, it can be readily fitted onto the outlet end portion 11B whereby the inherent resiliency of the arms A,A will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

It will be understood that, if desired, the opening 20A may be enlarged to the diameter of the foldline f, in which case the arms A,A and B,B may be gradually bent about the periphery of the enlarged opening, thereby eliminating the face portion 20.

Figure 7:
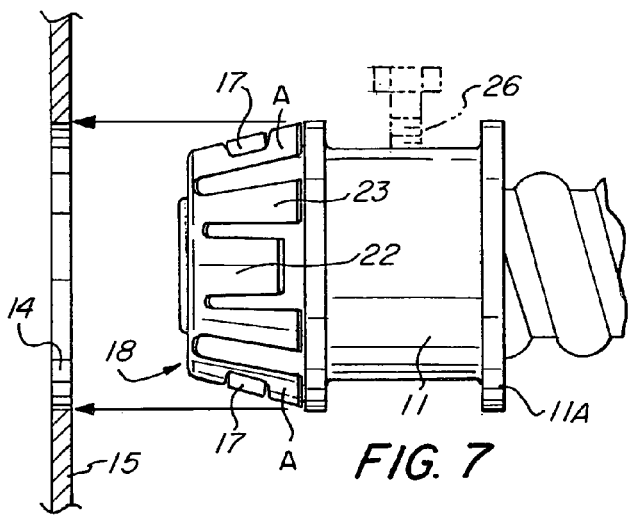
FIG. 7 is a side view of the connector assembly illustrating the alignment thereof relative to the knockout opening of an electric box.

With the retainer ring 18 properly secured to the outlet end 11B of the connector body 11, the connector assembly 10 can be readily secured to an electric box or panel 15 by simply aligning the assembly 10 with a knockout hole 14, as best seen in FIG. 7, and inserting the leading or outlet end portion into the knockout hole 14 until the flange 13 engages the outer side of the electric box or panel 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the bonding or grounding tangs 23, 23 and the free end or edge 24A of arms A,A are normally biased in engagement with the internal periphery of the knockout hole 14 to ensure a positive electrical ground with the electric box 15. The engagement of the free end 24A of arms A,A and bonding or grounding tangs 23, 23 against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means, including some of the securing wire conductor retaining means disclosed herein, may be used in lieu of a screw.

From the foregoing, it will be apparent that the disclosed connector assembly is quite novel and simple in construction. The snap fit retaining ring 18 can be simply formed from a cruciform shaped blank 19 of spring metal whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the bonding or grounding tangs 23 ensure a positive electrical ground of the assembly 10 with the associated electric box 15.

FIGS. 11 to 19 illustrate various views of a modified form of the invention which are described in application Ser. No. 11/100,250 filed Apr. 6, 2005, now U.S. Pat. No. 7,064,272, for Snap In Electrical Connector Assembly With Unidirectional Wire Conductor Ring, which is incorporated by reference herein in its entirety.

Figure 20:
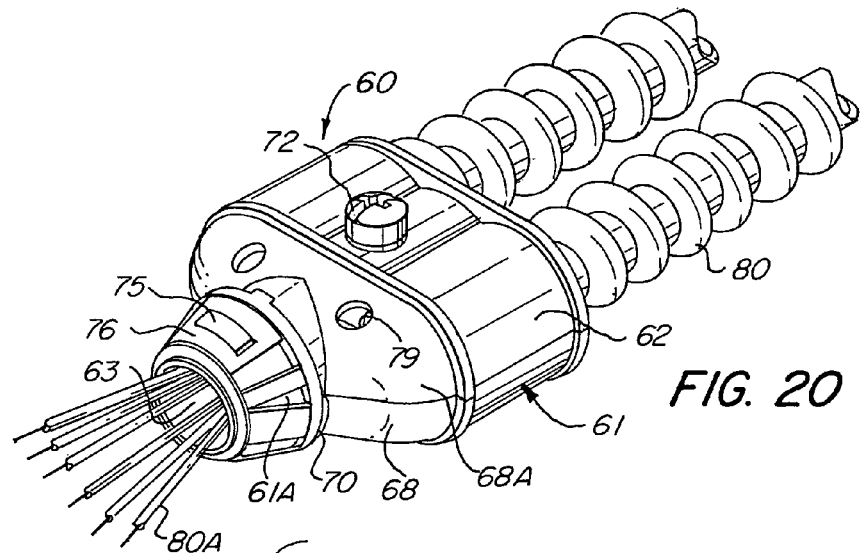
FIG. 20 is a perspective view of a further embodiment of the invention.
Figure 21:
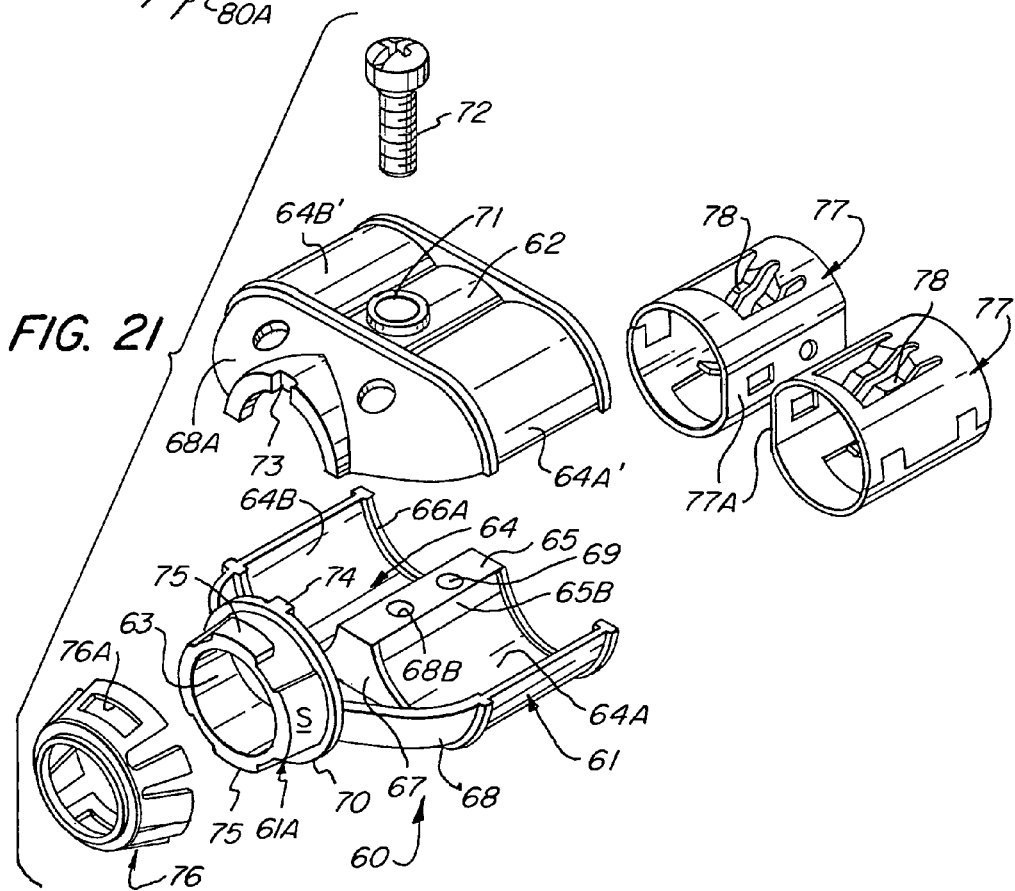
FIG. 21 is an exploded perspective view of the embodiment of FIG. 20.
Figure 22:
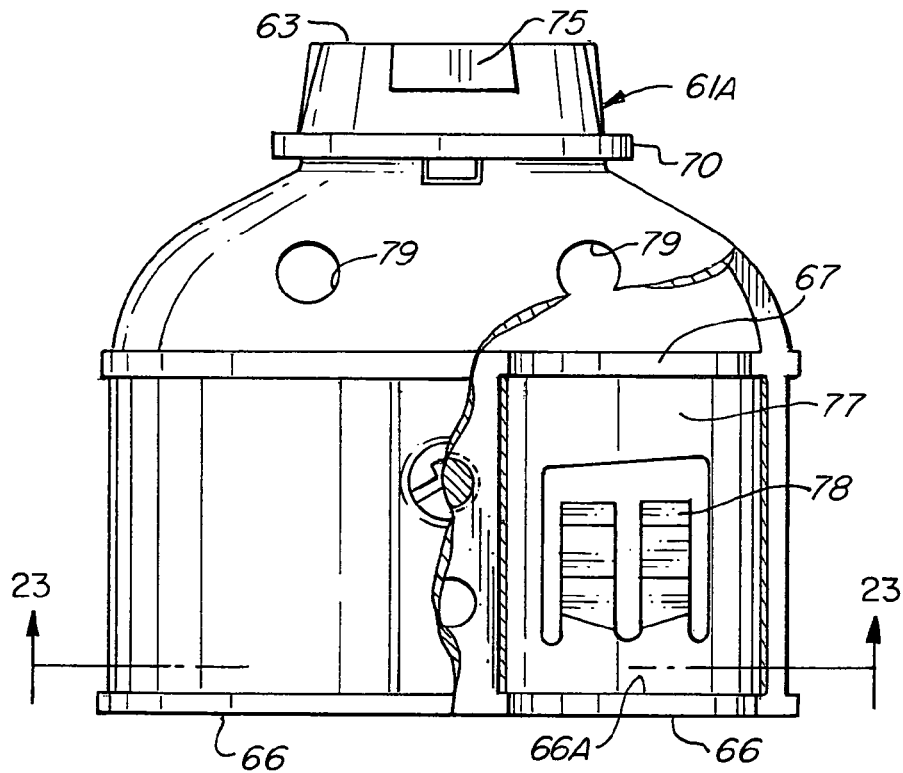
FIG. 22 is a top plan view of the embodiment of FIG. 20 having parts thereof broken away.
Figure 23:
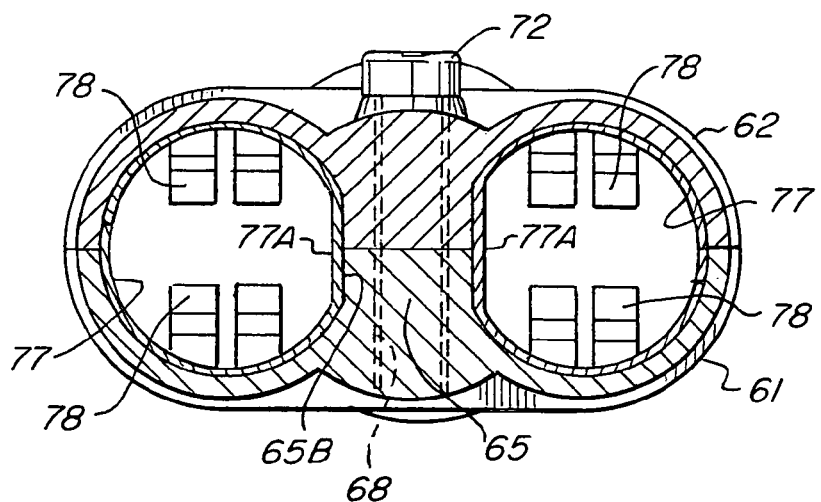
FIG. 23 is a sectional view taken along line 23-23 on FIG. 22.
Figure 24:
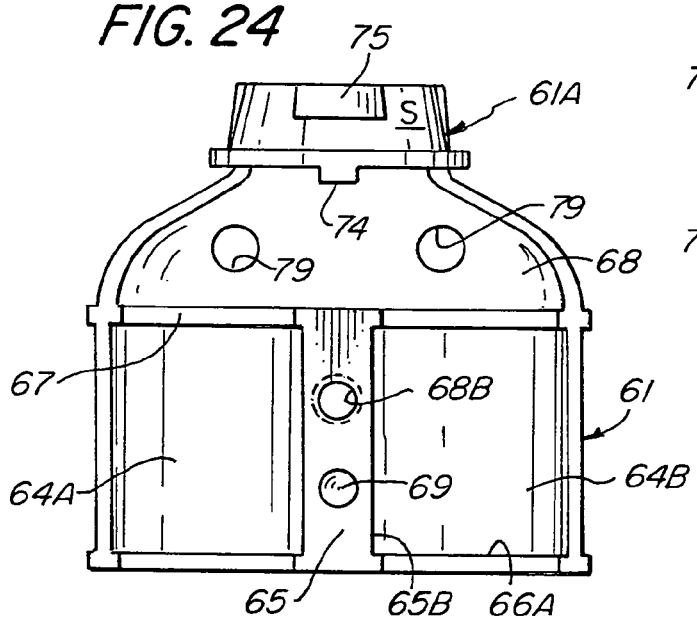
FIG. 24 is the interior plan view of one section of the connector housing of the embodiment illustrated in FIG. 20.
Figure 25:
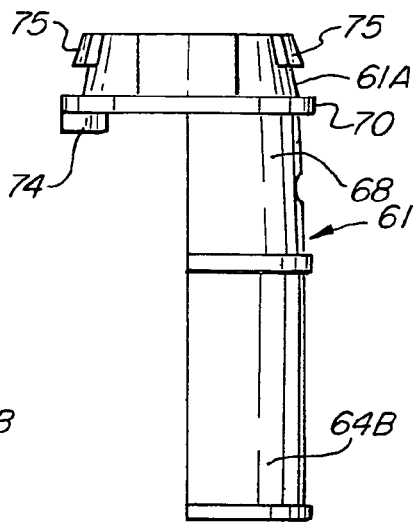
FIG. 25 is an outer end view of FIG. 24.
Figure 26:
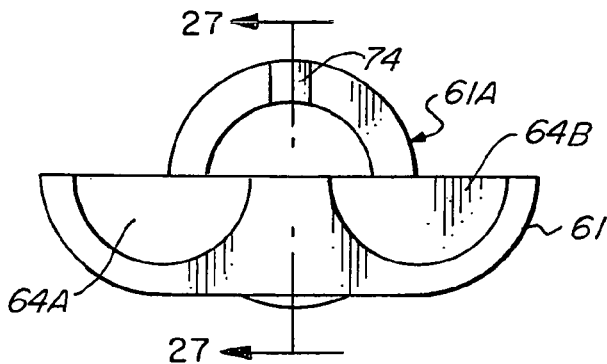
FIG. 26 is an end view of the connector housing section of FIG. 24.
Figure 27:
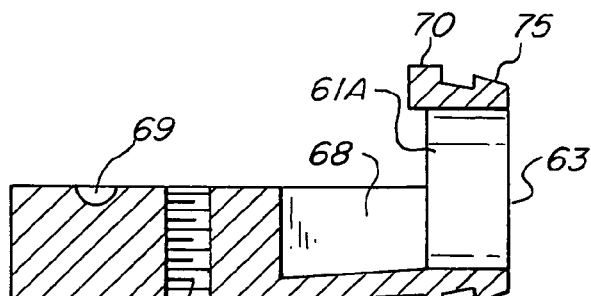
FIG. 27 is a sectional view of the housing section taken along line 27-27 on FIG. 26.
Figure 28:
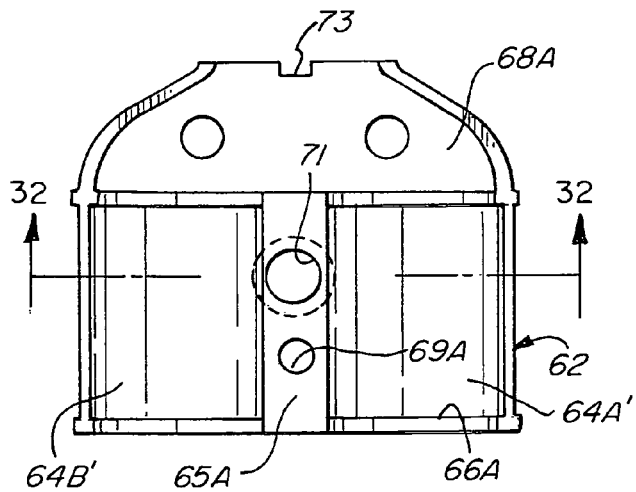
FIG. 28 is an inside plan view of the complementary housing section of the embodiment illustrated by FIG. 20.
Figure 29:
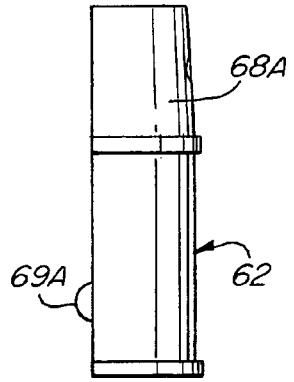
FIG. 29 is an end view of FIG. 28.
Figure 30:
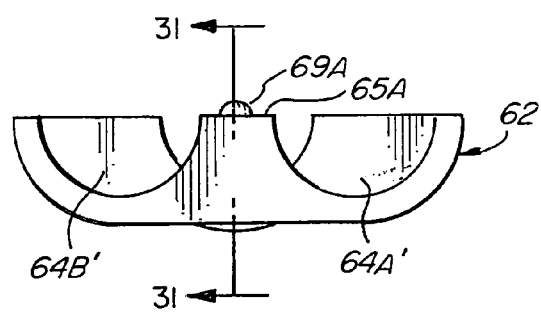
FIG. 30 is an inlet end view of FIG. 28.
Figure 31:
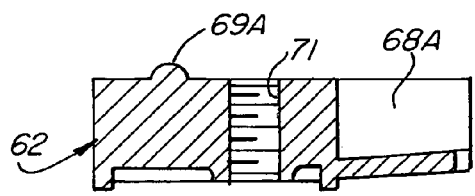
FIG. 31 is a sectional view taken on line 31-31 on FIG. 30.
Figure 32:
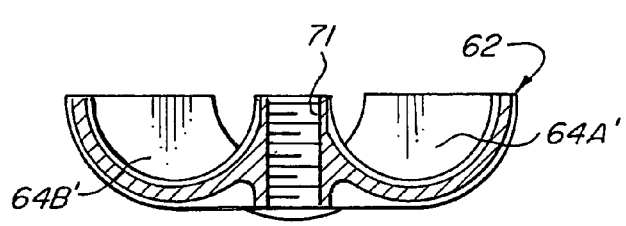
FIG. 32 is a sectional view taken on line 32-32 on FIG. 28.

FIGS. 20 to 32 are directed to a further modification of the disclosed invention. As best seen in FIGS. 20 and 21, the connector assembly 60 includes a housing or connector body 61 having an outlet end 61A and an inlet end 64 connected to the outlet end 61A by a transition section 68, 68A, preferably formed as casting of any suitable metal or alloy material, e.g. zinc, aluminum and the like. While the inlet end 64 of the connector body 61 is illustrated as a duplex inlet end, it will be understood that the inlet end may be formed to accommodate more than two separate wire conductors, cables or the like.

A more detailed description of the embodiments disclosed in FIGS. 20 to 32 is set forth in application Ser. No. 11/100,250 filed Apr. 6, 2005 for Snap In Electrical Connector Assembly With Unidirectional Wire Conductor Retaining Ring, now U.S. Pat. No. 7,064,272, which is incorporated herein by reference in its entirety.

With the connector body of FIG. 20 illustrated, it will be noted that the connector assembly 60 can be readily secured to an electric box or panel simply by inserting the leading or outlet end 61A through a knockout hole of a panel or electrical box so as to be readily secured thereto with a snap fit as hereinbefore described. With the arrangement described, the respective wire conductors or cables 80 can be readily attached to the trailing or inlet end of the connector assembly 60 with a simple snap fit, as described in the said application Ser. No. 11/100,250 filed Apr. 6, 2005, now U.S. Pat. No. 7,064,272, which is incorporated by reference herein in its entirety.

Figure 33:
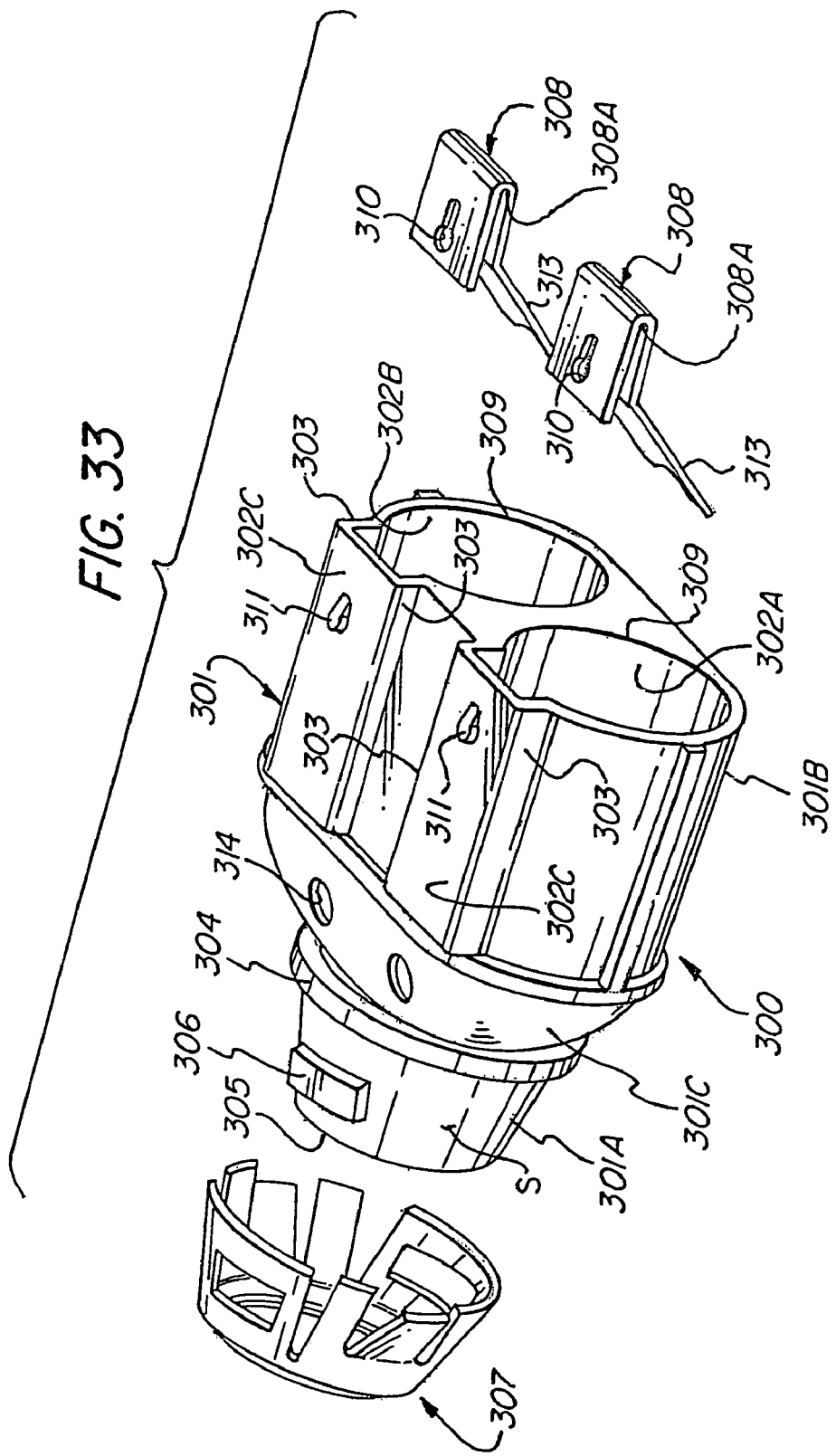
FIG. 33 is an exploded perspective view of still another modification of the invention.
Figure 34:
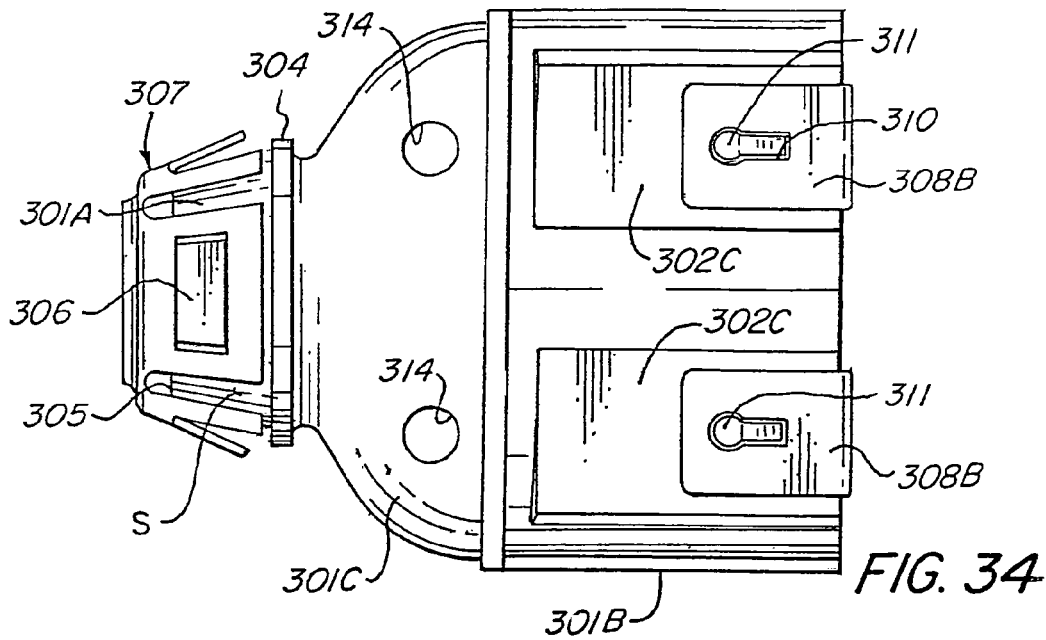
FIG. 34 is a top plan view of the embodiment of FIG. 33.
Figure 35:
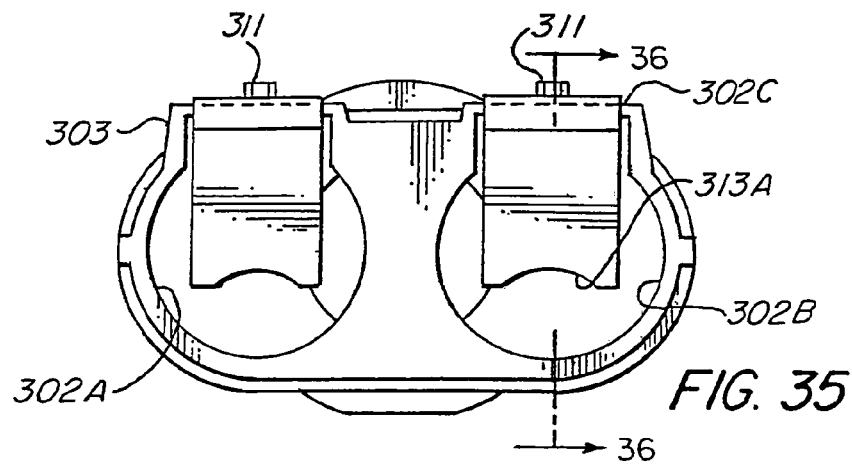
FIG. 35 is a right end view of FIG. 34.
Figure 36:
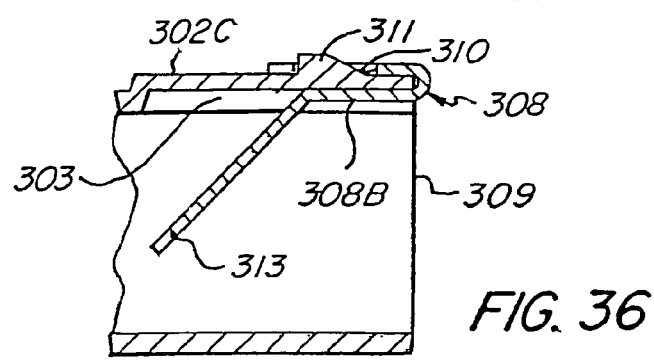
FIG. 36 is a sectional view taken along line 36-36 on FIG. 35.

FIGS. 33 to 36 illustrate a further embodiment of the invention. The connector assembly 300, as illustrated in FIGS. 33 and 36, includes a connector body 301 formed as a unitary casting of any suitable metal or alloy, e.g. zinc and the like. The embodiment of FIG. 33 differs from that of FIG. 20 in that connector body 301 is formed as a unitary casting rather than as separable parts as illustrated in FIG. 20. A more detailed description of the embodiment of the connector assembly of FIGS. 33 to 36 is set forth in application Ser. No. 11/403,099 filed Apr. 12, 2006, for Snap Fit Electrical Connector Assembly With Frustro-Conical Retainer Ring And Internal Unidirectional Snap Fit Wire Conductor Retainer, now U.S. Pat. No. 7,151,223, which is incorporated by reference herein in its entirety.

Figure 37:
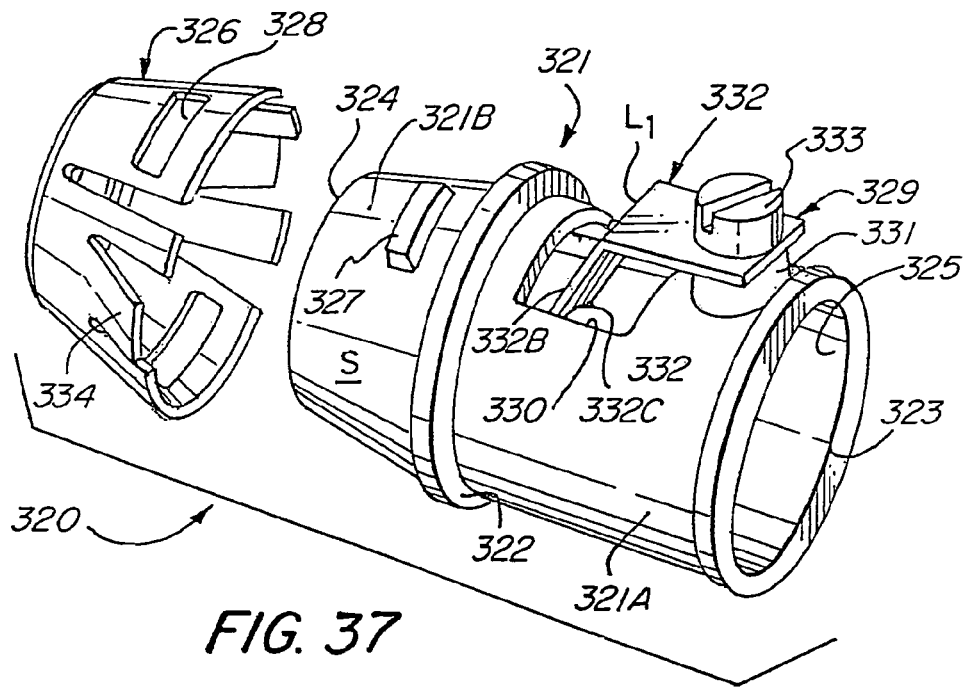
FIG. 37 is a perspective of a partially exploded view of another embodiment of the disclosed invention.
Figure 38:
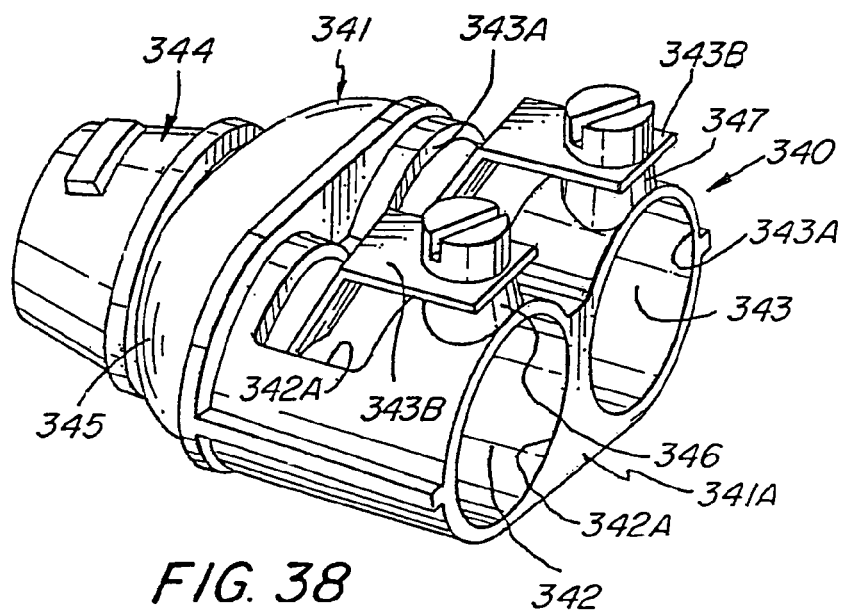
FIG. 38 is a perspective view of another modified form of the disclosed invention illustrated without the outer retainer ring.
Figure 39:
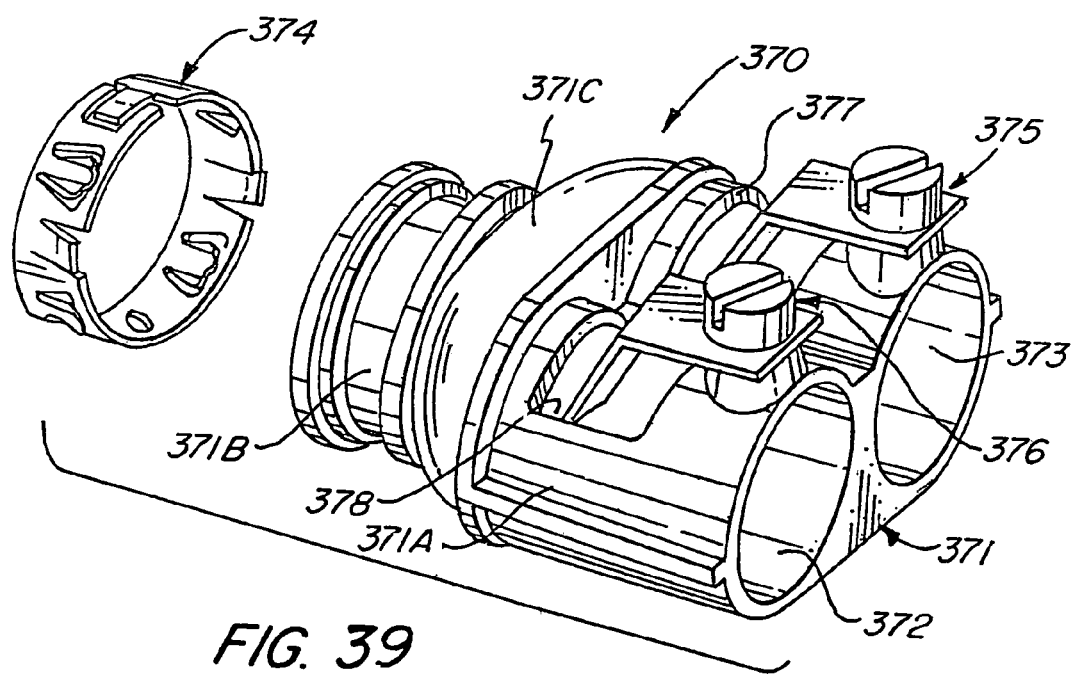
FIG. 39 is a perspective exploded view of a modified form of the invention.

FIGS. 37, 38 and 39 illustrate further modified embodiments of the invention which are disclosed in application Ser. No. 11/501,131 filed Aug. 8, 2006, now U.S. Pat. No. 7,488,905, for Electrical Connector With Outer Retainer Ring And Unidirectional Conductor Retainer, which is also incorporated by reference herein, and need not be repeated herein.

FIGS. 40 to 45 are directed to other modified embodiments of the invention. FIGS. 40 to 45 are directed to a strap-type electrical connector 500 for securing either nonmetallic cables or armor or metal clad cables thereto, as will be described herein.

As best seen in FIGS. 40-44, the illustrated strap type connector 500 includes a connector body 501 having an outlet end 502 terminating in an outlet opening 503. Opposite the outlet opening 503, the connector body 501 is provided with an inlet opening 504. Circumscribing the connector body between the outlet opening 503 and the inlet opening 504 is a radially outwardly extending flange 505 which serves as a stop to limit the distance the outlet end portion of the connector body 501 may be inserted through a knockout hole or opening 506 of an electric box or panel 507. The outer surface "S" of the outlet end 502 slopes or converges inwardly toward the outlet opening 503.

Circumferentially spaced about the outlet end 502 of the connector body 501 are one or more radially outwardly projecting retaining lugs 508. In the illustrated embodiment, two such retaining lugs 508 are provided 180° apart.

Secured to the outlet end 502 of the connector body and circumscribing the outlet end 502 is a frustro-conical snap fit retainer or retainer ring 509, similar to the frustro-conical retainer ring hereinbefore described with respect to FIGS. 1 to 5 herein. As best seen in FIG. 40, the frustro-conical, snap-fit, retainer 509 includes a front opening 510 circumscribed by rearwardly and outwardly sloping or bent locking tangs 511. Bonding or grounding tangs 513 are provided with retaining slots 514 arranged to receive the retaining lugs 508 when fitted onto the outlet end 502 of the connector body 501, as hereinbefore described.

Connected to the connector body 501 adjacent the inlet opening and forming an integral part of the connector body 501 is a cable support saddle 515 which extends about a circumferential portion of the inlet opening 504, e.g. between approximately 120° to 180° about the inlet opening 504. As shown, the cable support saddle 515 is a curvilinear extension of the inlet opening 504 terminating in laterally outwardly extending ears or lobes 515A and 515B. As best seen in FIG. 40, ear or lobe 515A has a hinge slot 516 formed therein and ear or lobe 515B is provided with an internally threaded hole 517.

Hingedly connected to ear or lobe 515A is a clamping strap 518. As best seen in FIG. 40, the clamping strap 518 is provided with a readily detachable hinge structure 519 which is angularly formed relative to the plane of the strap 518 so as to be received in the hinge slot 517 when connected to the saddle 515. According to this invention, the hinge structure 519 terminates laterally outwardly extending foot portion 520.

In accordance with this invention, the foot portion 520 of the hinge structure 519 is provided with a width "W" which is slightly greater than the width "w" of the hinge slot 516. The arrangement is such that the clamping strap 518 must be skewed or angled relative to the hinge slot 516 for inserting the foot portion 520 through the hinge slot 516 for connecting the clamping strap 518 to the ear or lobe 515A. When so connected, the clamping strap 518 is free to pivot relative to the saddle 515 between a cable clamping and unclamping position without causing the clamping strap 518 to become detached from the saddle 515. To effect detachment of the clamping strap 518 from the ear or lobe 515A, one must intentionally skew or angle the clamping strap 518 relative to the hinge slot 516 to effect the removal of the clamping strap 518 from the saddle.

The other end of the clamping strap 518 is provided with a strap hole 521 for receiving a fastener, e.g. a screw 522 for securing the clamping strap 518 to the ear or lobe 515B so that the cable is firmly clamped and secured between the saddle 515 and the clamping strap 518.

To insure a positive gripping of the cable between the saddle 515 and the clamping strap 518, an intermediate portion of the clamping strap is provided with a depression 523 that will "bite" or exert a positive frictional force on the cable, when secured in the clamping position (FIG. 86) so as to prohibit the cable of being pulled free or become accidentally detached from the connector body.

As shown, the connector body 501 and connected saddle 515 is preferably formed as a metal casting, e.g. zinc or other suitable metallic alloy. The strap electric connector as illustrated in FIGS. 40 to 44 is preferably used for securing either a non-metallic cable or romex type conductor to an electric box or panel.

By slightly modifying the shape of the clamping strap, the described strap type electric connector may be readily adapted for connecting an armored, or metal clad cable, to an electric box or panel.

Figure 45:
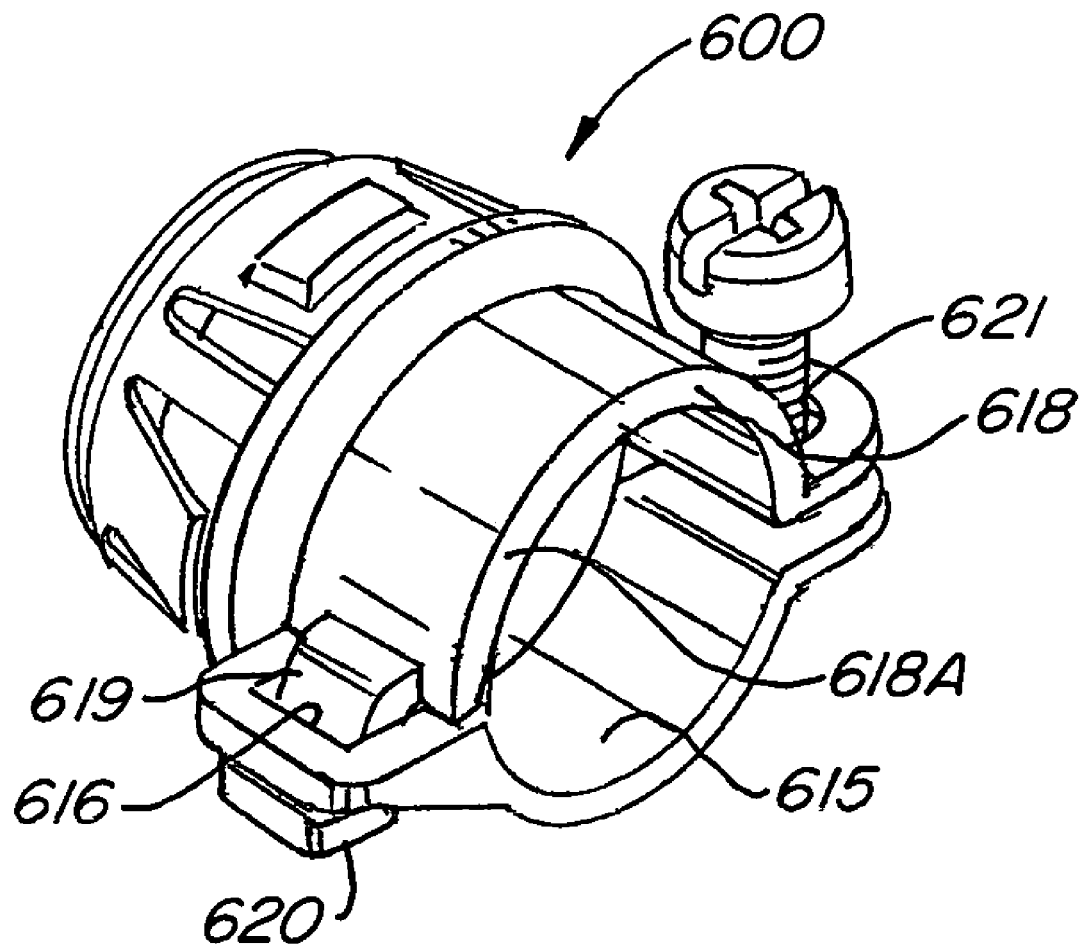
FIG. 45 is a perspective view of a modified strap type electrical connector.
Figure 49:
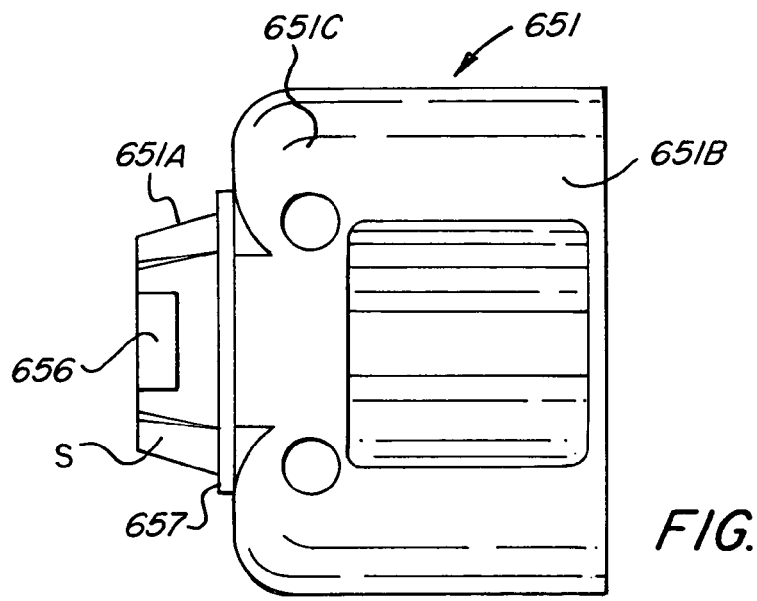
FIG. 49 is a top plan view of a duplex connector body of FIG. 46.

FIG. 45 illustrates a modified strap type electrical connector assembly 600 for use in securing an armor or metal clad cable. As shown in FIG. 45, the strap type electrical connector assembly 600 is provided with clamping strap 618 having an intermediate curvilinear portion 618A shaped to compliment the roundness of a metal clad cable, e.g. a BX cable. One end of the armored cable strap is provided with a hinge structure 619, 620 similar to the hinge structure 519, 520 hereinbefore described, whereby the armored cable strap can be hingedly connected to the hinge slot 616 of the associated saddle 615. The other end of the armored cable strap 618 is provided with a hole or opening 621 for receiving a fastening screw similar to that described with respect to FIG. 84. In all other respects, the function and structure of the strap connector 600 is similar to that described with respect to FIGS. 84 to 88, and need not be repeated.

From the foregoing description, it will be noted that the armored cable strap 618 can be readily interchanged for the non-metallic cable strap 518 depending upon the type of cable to be secured by the described connector body.

It will be apparent that the principle components described herein, viz. the external frustro-conical retainer rings, the connector bodies and the differently described wire conductor retainers, are rendered readily interchangeable with respect to any of the complementary corresponding components of the various embodiments described herein.

It is to be further noted that the frustro-conical retainer ring, as described herein with respect to the various embodiments disclosed, achieves the further advantage of ensuring positive electrical bonding or grounding of the described connector assemblies to an electrical box or panel despite the varying allowable diameter tolerances a knockout hole may have, as permitted by the allowable codes or electrical standards, due to the inherent resiliency and shape that a frustro-conical configuration allows, as described herein.

Referring to FIGS. 46 to 51, there is disclosed a further improvement of the invention describe herein. FIG. 46 illustrates an exploded view of a duplex type connector assembly 650 that includes a connector body 651 having a single outlet end portion 651A and a duplex inlet end portion 651B. As shown, the inlet end portion 651B includes a pair of parallel passageways or bores 652, 653 that are in communication with the outlet end portion 651A. Between the inlet end portion 651 and the outlet end portion 651A is a transition section 651C, which diverges toward the outlet end opening 354. The respective passageways or bore are separated by a partition wall 655 having opposed vertical surfaces 655A, 655B, as viewed in FIGS. 46-48.

As hereinbefore described, the outlet end portion 651A which defines an outlet opening 654 is provided with a tapered outer surface S which converges toward the outlet opening 654. Circumferentially spaced about the outlet opening and extending radially outward relative to the surface S of the outlet end portion 651A are opposed retaining lugs 656. A radially outwardly extending stop flange 657 circumscribes the outlet end portion 651A adjacent to the transition section 651C, which functions as a stop to limit the amount the connector body may be inserted into a knockout hole of an electric box or panel, as herein previously described. In this form of the invention, the connector body 651 is constructed so that it can be readily formed as a unitary casting from a suitable moldable metal alloy, e.g. zinc, aluminum and the like. Such integrally constructed connector body obviates the prior practice of constructing a connector body of multiple parts which required assembly.

Circumscribing the outer surface S of the outlet end portion 651A is a frustro-conical outer retainer 658 similar to that described with respect to FIGS. 1 to 10, and which need not be repeated.

Disposed within each of the respective passageways or bore 652, 653 is a wire or cable unidirectional retainer means. In the illustrated embodiment, the unidirectional retainer means is in the form of a sleeve or cylinder 659, 660 formed preferably from a blank of spring steel as hereinbefore described with respect to FIGS. 13 to 18. As described, the respective wire or cable retainers 659, 660 have a generally circular configuration except for a flattened or linear wall surface 659A, 660A, which is arranged to engage the adjacent vertical wall surface 655A, 655B of the partition wall 655 in the inlet end portion 651B when inserted into their associated passageways or bores 652, 653. The arrangement is such that the orientation of the respective wire or cable retainers 656, 660 relative to their respective passageways or bores are predetermined. As previously described, the respective wire or cable retainers are proportioned and sized so as to be press fitted or frictionally fitted within their corresponding bore or passageway 653, 653 in a manner to withstand any unintentional separation of the cable retainer from its corresponding bore. In all other respects, the construction and function of the internal wire or cable retainer is similar to that hereinbefore described with respect to FIGS. 13 and 18.

Figure 50:
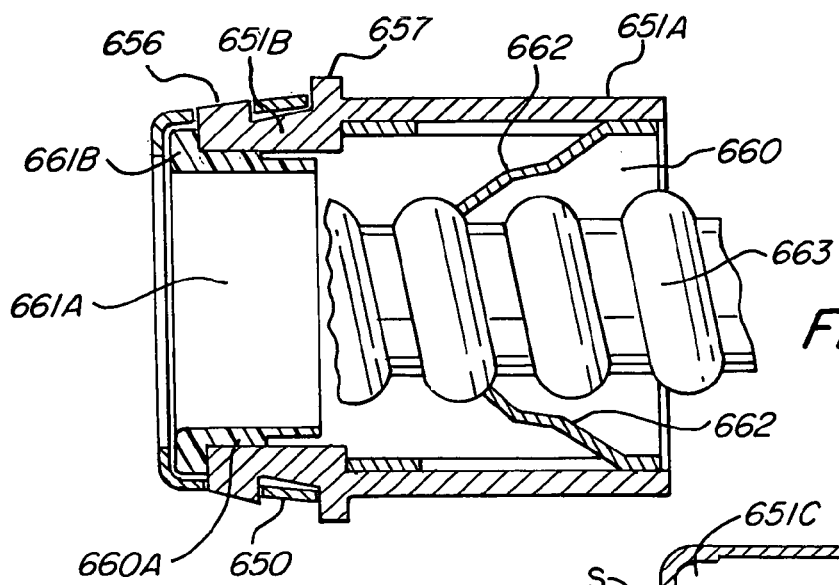
FIG. 50 is a sectional side view of the electrical duplex connector assembly of FIG. 46 in the assembled position of the component parts.
Figure 51:
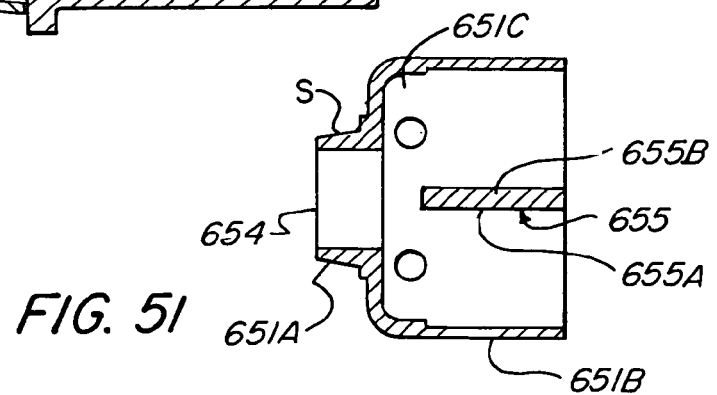
FIG. 51 is a sectional view on a reduced scale of the connector body taken along section line 51-51 on FIG. 46.

As noted in FIGS. 46 and 50, the connector assembly 650 includes a bushing 661, constructed preferably of a plastic non-conducting material arranged to be inserted in the outlet opening 654 of the connector body 651. The bushing 661 includes a cylindrical body portion 661A sized and shaped so as to complement the internal surface of the outlet opening 654 with a friction or press fit. The leading end of the bushing 661 is provided with a radially outwardly extending flange 661B which functions as a stop to limit the insertability of the bushing 661 within the outlet end opening 654.

In the assembled position of the respective component parts, it will be noted that the bushing 661 is inserted and secured within the outlet end opening 654 before the frustro-conical external retainer 650 is secured about the outlet end portion 651B of the connector body. Thus, the engagement of the frustro-conical retainer 650 with the retainer lugs 656 insures that the bushing 661 is prevented from being separated from the outlet opening as it is firmly sandwiched between the outlet opening 654 of the connector body 651 and the frustro-conical retainer 650 secured to the outlet end portion 651B. However, the bushing 661 may also be placed in the outlet end opening 654 after the frustro-conical retainer 650 has been inserted onto the outlet end opening 654.

As the cable retainers 659, 660 are provided with forwardly inclined retaining tangs 662, the respective cable or wire conductors 663 can be readily secured thereto simply by inserting the cable or wire conductor into the respective inlet passageways whereby the retaining tangs permit only unidirectional insertion while resisting an opposing force applied to the cable or wire conductor so as to prohibit any unintentional separation of the cable or wire conductor from the connector body 651.

The simplicity of a duplex connection having a unitary connector body construction provided with an outer frustro-conical retainer for securing the same with a snap fit locking arrangement to an electric box or panel, and the ease by which a wire conductor can be secured to a connector body utilizing the described internal cable retainers enhances the ease of manufacture and assembly of such connectors to result in substantial savings of labor and costs for producing the same, while enhancing the ease of use of such connectors in the field which further aids to minimize the time, effort and labor required to install the same.

Figure 52:
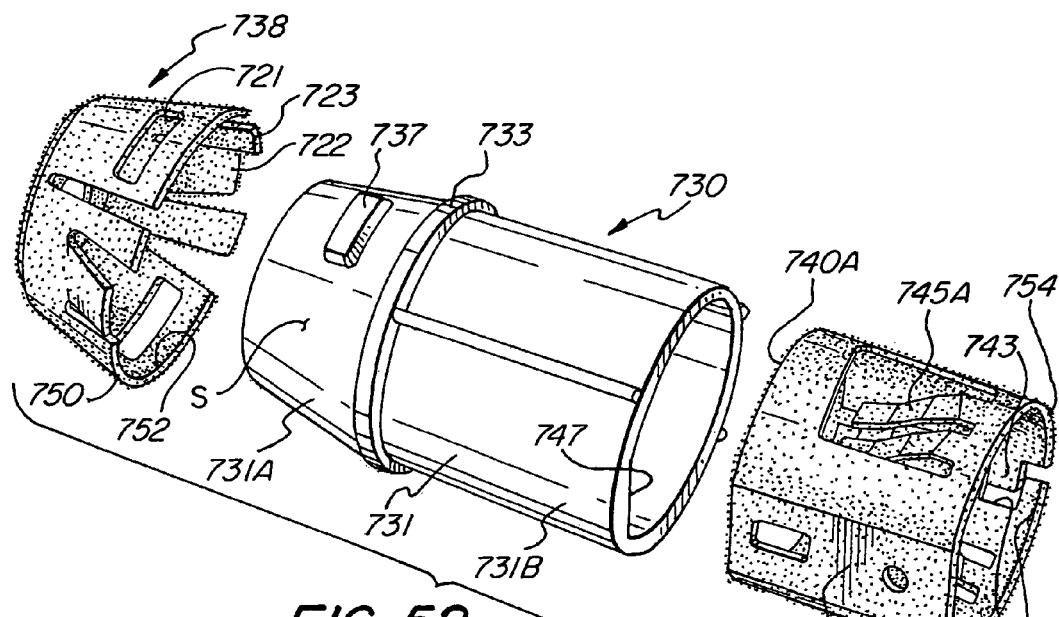
FIG. 52 is an exploded perspective view of another embodiment of the present invention having improved conductivity.
Figure 53:
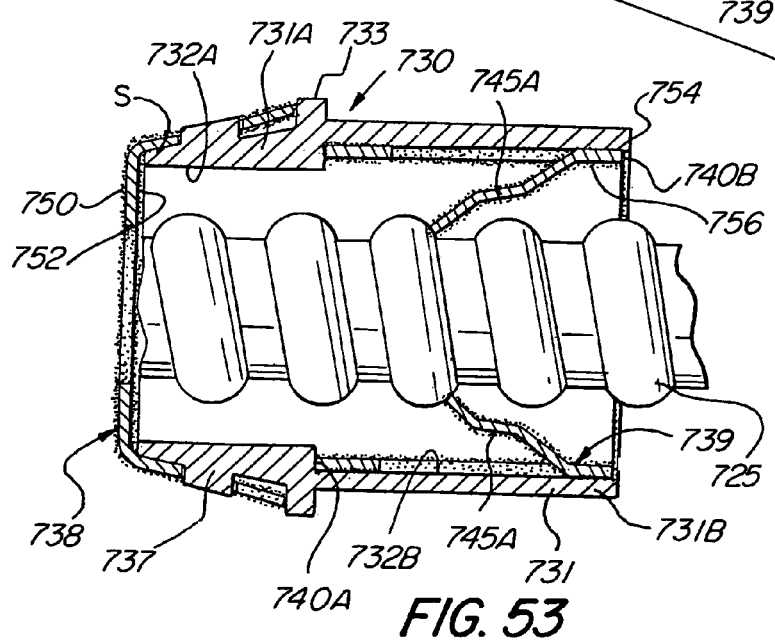
FIG. 53 is a longitudinal cross section of the assembled electrical connector illustrated in FIG. 52.
Figure 54:
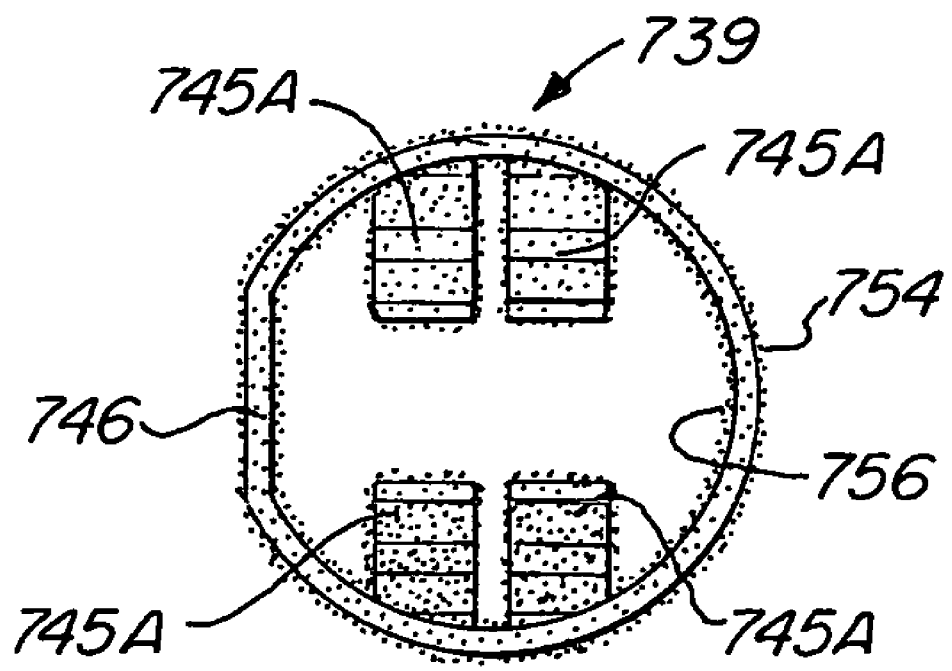
FIG. 54 is a lateral cross section of the cable retainer portion of the electrical connector illustrated in FIG. 52.

FIGS. 52 to 54 illustrate another embodiment of the invention disclosed herein. Illustrated in FIGS. 52 to 54 is an electrical connector assembly 730 having improved conductivity and continuity when attached to an electrical box or junction box, not shown, and flexible metal conduit 725. The connector body 731 has a conically shaped outlet end 731A and an inlet end 731B. A bore 732B extends through the connector body 731. The conically shaped outlet end 731A has a sloping surface S. On the sloping surface S are retaining lugs 737. The retaining lugs 737 mate with retaining slots 721 formed in an outer retaining ring 738. The outer retaining ring 738 has bonding or grounding tangs 723 and locking tangs 722 formed therein as a cantilever. The outer retaining ring 738 is formed from spring steel or metal with dies used to cut and shape it. A radially outwardly extending stop flange 733 is formed on the connector body 731 adjacent the sloping surface S. A cable retainer 739 is placed in bore 732B. The cable retainer 739 is made of spring steel or metal and has opposing pairs of tangs 745A lanced from a central portion of the surface. The cable retainer 739 is generally cylindrical and has a longitudinal leading edge 740A and a longitudinal trailing edge 740B. The cable retainer 739 has a flattened portion 746 opposing a split portion having tongues 743 and spaced apart notches 741 permitting the cable retainer 739 to be frictionally retained within the bore 732B. The flattened portion 746 complements a complementary flattened surface 747 formed within the bore 732B of connector body 731. The connector body is generally made of zinc or a zinc alloy and is typically die cast.

The outer retainer ring 738 is plated with a metal having electrical conductivity higher than zinc, such as and preferable tin or a tin alloy. The plating of metal on the outer retainer ring 738 is preferably formed on the entire surface; inner, outer, and edge surfaces. An outer tin plate 750 and an inner tin plate 752 are formed on the inner surface and the outer surface of the outer retainer ring 738. Similarly, the cable retainer 739 has an outer tin plate 754 and an inner tin plate 756 formed on the inner and outer surface. The tin plate or plating may be a matte or bright finish and preferable has a thickness of between 0.00015 and 0.00030 inches, or between 0.0381 and 0.0762 millimeters. The tin plating may be electrodeposited using standard techniques, such as per ASTM B545 (Type I) standards. Different high conductivity metals and tin or tin alloys may be used, such as tin-zinc, tin-lead, or tin-nickel. Tin has a much higher conductivity than zinc, and is similarly corrosion resistant. Additionally, high conductivity metals other tin or tin alloys may be used such as silver or gold.

The plating of the spring steel parts with a higher conductivity metal than the cast connector body 731, such as the outer retraining ring 738 and the cable retainer 739 substantially improves the conductivity and continuity of the connector assembly 730. In applications using a snap-in or push-in type electrical connector assembly, the reduced surface area contact and the lower contact pressures of the spring steel parts versus threaded locknuts often results in lower continuity and increased voltage drop across the electrical connector assembly once attached to an electrical or junction box. Typically, there are electrical standards, such as Underwriters Laboratory or UL standards, that have a maximum permitted voltage drop across an attached electrical connector. These standards assure for a safe electrical connection that is adequately bonded or grounded.

While the terms bonding and grounding or often used synonymously, the present invention is more accurately directed to electrical bonding. The National Electric Code defines bonding as a low impedance path obtained by securely joining all non-current carrying metal parts to assure electrical continuity and having the capacity to conduct safely any current likely to be imposed upon it and defines grounding as a permanent and continuous conducting path to the earth with sufficient ampacity to carry any fault current liable to be imposed upon it, and of sufficiently low impedance to limit the voltage rise above ground and to facilitate the operation of the protective devices in the circuit. Therefore the present invention improves continuity of snap-in or push in electrical connectors that may be applied to either electrical bonding or grounding.

The present invention quite surprisingly results in a substantial decrease in voltage drop across an electrical connector. In experiments, a prior snap-in or push-in electrical connector having conventional zinc construction had an average voltage drop of 34.5 millivolts. A similar snap-in or push-in electrical connector incorporating the present invention of an outer tin plate had an average voltage drop of 26.7 millivolts, and of both an outer tin plate and an inner tin plate had an average voltage drop of 25.6 millivolts. The tin plate had a matte finish and a thickness of 0.00015 inches or 0.0381 millimeters. This substantial reduction in voltage drop indicates substantially improved continuity in a snap-in or push-in electrical connector assembly. The substantial improvement is unexpected. Therefore, electrical connectors according to the teaching of the present invention will result in snap-in or push-in electrical connector assemblies that are will within the voltage drop standards established for electrical connectors. The present invention, therefore, is an improvement over prior electrical connectors and results in a safer more reliable electrical connector.

Figure 55:
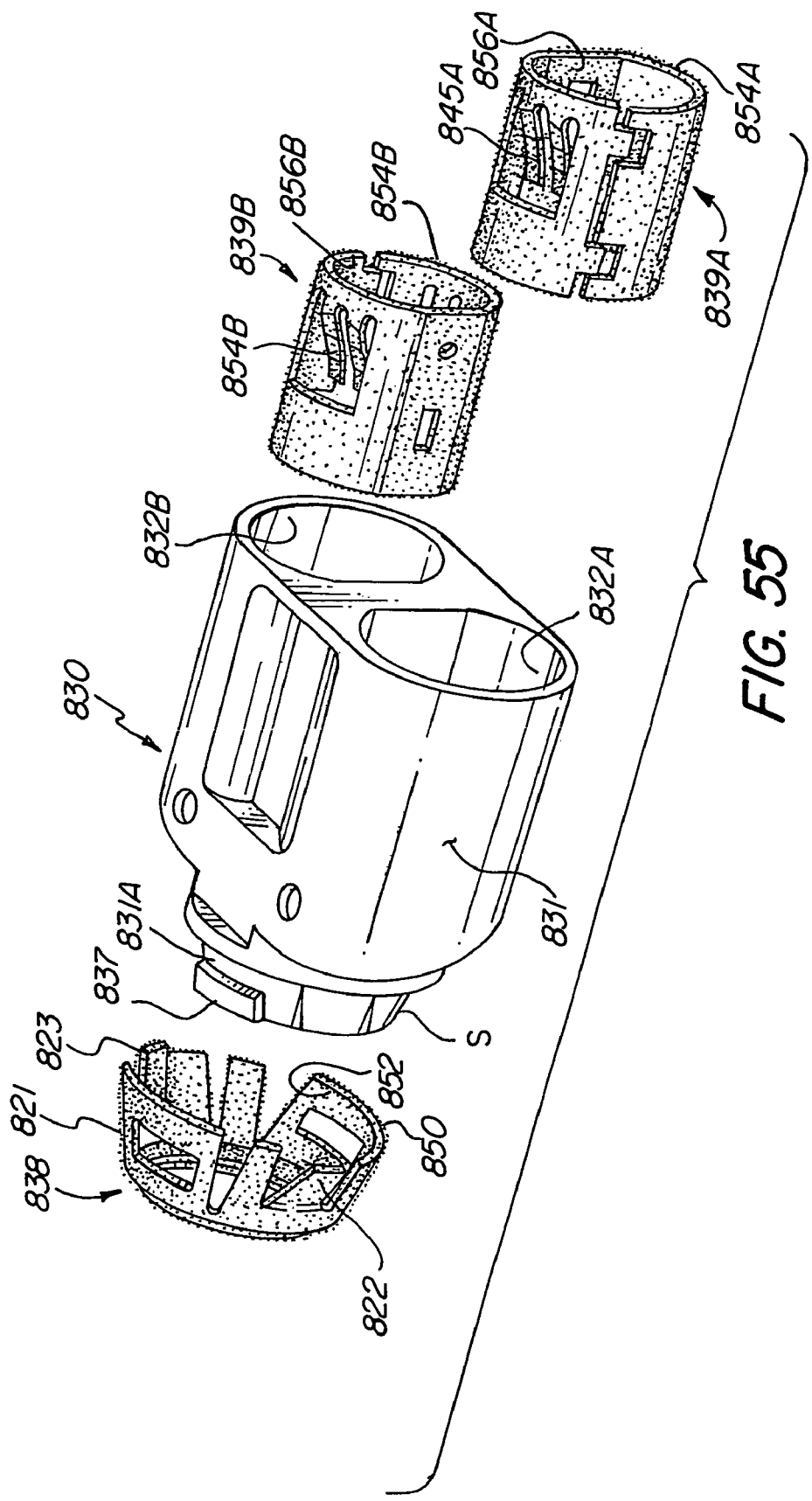
FIG. 55 is an exploded perspective view of another embodiment of a duplex connector of the present invention having improved conductivity.

FIG. 55 illustrates another embodiment of the present invention. In this embodiment a duplex electrical connector assembly is illustrated. The duplex electrical connector assembly 830 has improved conductivity and continuity when attached to an electrical box or junction box, not shown, and flexible metal conduit, not shown. The connector body 831 has a conically shaped outlet end. Bore 832A and 832B extend through the connector body 831. The conically shaped outlet end 831A has a sloping surface S. On the sloping surface S are retaining lugs 837. The retaining lugs 837 mate with retaining slots 821 formed in an outer retaining ring 838. The outer retaining ring 838 has bonding or grounding tangs 823 and locking tangs 822 formed therein as a cantilever. The outer retaining ring 838 is formed from spring steel with that has been shaped and cut with dies or other conventional metal forming tools. Cable retainers 839A and 839B are placed in respective bores 832A and 832B. The cable retainers 839A and 839B are made of spring steel and have opposing pairs of tangs 845A and 845B lanced from a central portion of the surface. The cable retainers 839A and 839B are generally cylindrical. The connector body is generally made of zinc or a zinc alloy and is typically die cast.

The outer retainer ring 838 is plated with a metal having electrical conductivity higher than zinc, such as and preferable tin or a tin alloy. An outer tin plate 850 and an inner tin plate 852 are formed on the inner surface and the outer surface of the outer retainer ring 838. Similarly, the cable retainers 839A and 839B have, respectively, an outer tin plate 854A and 854B and an inner tin plate 856A and 856B formed on the inner and outer surfaces, respectively. The tin plate or plating may be a matte or bright finish and preferable has a thickness of between 0.00015 and 0.00030 inches, or between 0.0381 and 0.0762 millimeters.

As indicated in the embodiment illustrated in FIGS. 52 and 54, the tin plate or plating substantially increase continuity and conductivity of the duplex electrical connector assembly when attached to an electrical or junction box. This improved continuity and conductivity results in a lower voltage drop across the electrical connector assembly increasing performance and improving safety relative to prior electrical connectors.

While the present invention has been described with respect to several embodiments, it will be understood that various modifications may be made without departing from the spirit or scope of the invention.

What is claimed is:

1. An electrical connector assembly comprising:
   a connector body having an inlet end and an outlet end made of a conductive material having a first electrical conductivity;
   a cable retainer attached to the inlet end of said connector body;
   a retaining ring made of spring steel attached to the outlet end of said connector body; and
   a plating of a high conductivity material on the spring steel of said retaining ring, the high conductivity material having an electrical conductivity greater than the conductive material,
   whereby a voltage drop across the connector is reduced.

2. An electrical connector assembly as in claim 1, wherein:
   the high conductivity material is selected from the group consisting of tin, tin-zinc alloy, tin-lead alloy, tin-nickel alloy, silver, and gold.

3. An electrical connector assembly as in claim 1, wherein comprising:
   a connector body having an inlet end and an outlet end made of a the conductive material comprises zinc alloy;
   a cable retainer attached to the inlet end of said connector body;
   a retaining ring made of spring steel attached to the outlet end of said connector body; and
   the high conductivity material comprises a plating comprising tin on the spring steel of said retaining ring,
   whereby a voltage drop across the connector is reduced.

4. An electrical connector assembly as in claim 1, wherein:
   said cable retainer is made of spring steel and plated with the high conductivity material.

5. An electrical connector assembly as in claim 1, wherein:
   said retaining ring comprises a conical shape; and
   the outlet end of said connector body has a shape complementing the conical shape of said retaining ring.

6. An electrical connector assembly as in claim 1, wherein:
   the electrical connector comprises a duplex electrical connector.

7. A snap in electrical connector assembly comprising:
   a connector body having an inlet end portion and an outlet end portion;
   a sloping surface formed on said outlet end portion;
   a retaining lug formed on said sloping surface;
   a stop flange adjacent said sloping surface;
   a frustro-conical outer retainer made of spring steel having a central opening, a retaining slot, and a plurality of locking tangs, wherein said frustro-conical outer retainer is placed on said sloping surface and the retaining slot is placed over said retaining lug holding said frustro-conical outer retainer onto the outlet end portion;
   a first plating of a first metal material placed on the spring steel of said frustro-conical outer retainer, the first metal material having a conductivity greater than zinc;
   a bore formed in the inlet end portion of said connector body;
   a cable retainer made of spring steel inserted into said bore;
   forwardly inclined retaining tangs formed in said cable retainer; and a second plating of a second metal material placed on the spring steel of said cable retainer and said forwardly inclined retaining tangs, the second metal material having a conductivity greater than zinc, whereby the snap in electrical connector assembly has an improved conductivity and continuity.

8. A snap in electrical connector assembly as in claim 7 wherein:

the plurality of locking tangs are blanked and cantileverely bent out of a surface of said frustro-conical outer retainer wherein free ends of said locking tangs are angularly inclined toward said stop flange.

9. A snap in electrical connector assembly as in claim 8 further comprising:

a plurality of bonding or grounding tangs formed on said frustro-conical outer retainer.

10. A snap in electrical connector assembly as in claim 7 wherein:

the first and second metal material are selected from the group consisting of tin, tin-zinc alloy, tin-lead alloy, tin-nickel alloy, silver, and gold.

11. A snap in electrical connector assembly as in claim 7 wherein:

the first and second metal material comprises tin.

12. A snap in electrical connector assembly as in claim as in claim 7 wherein:

the first and second metal material has a thickness ranging between 0.00015 and 0.00030 inches or between 0.0381 and 0.0762 millimeters.

13. A snap in duplex electrical connector assembly comprising:

a connector body having an inlet end portion and an outlet end portion;

a sloping surface formed on said outlet end portion;

a pair of retaining lugs formed on said sloping surface;

a stop flange adjacent said sloping surface;

a frustro-conical outer retainer made of a spring steel having a central opening, a pair of retaining slots, a plurality of locking tangs, and a plurality of bonding or grounding tangs, wherein said frustro-conical outer retainer is placed on said sloping surface and one of the pair of retaining slots is placed over a respective one of said pair of retaining lugs holding said frustro-conical outer retainer onto the outlet end portion;

a first plating of a first metal material placed on the spring steel of said frustro-conical outer retainer, the first metal material having a conductivity greater than zinc;

a pair of parallel passageways formed in the inlet end portion of said connector body;

a pair of cable retainers made of spring steel, one of said pair of cable retainers inserted into a respective on of said pair of parallel passageways;

a pair of opposing forwardly inclined retaining tangs formed in each of said pair of cable retainers; and a second plating of a second metal material placed on the spring steel of said cable retainer and said forwardly inclined retaining tangs, the second metal material having a conductivity greater than zinc, whereby the snap in duplex electrical connector assembly has an improved conductivity and continuity.

14. A snap in duplex electrical connector assembly as in claim 13 wherein:

the plurality of locking tangs are blanked and cantileverely bent out of a surface of said frustro-conical outer retainer wherein free ends of said locking tangs are angularly inclined toward said stop flange.

15. A snap in duplex electrical connector assembly as in claim as in claim 13 wherein:

the first and second metal material are selected from the group consisting of tin, tin-zinc alloy, tin-lead alloy, tin-nickel alloy, silver, and gold.

16. A snap in duplex electrical connector assembly as in claim as in claim 13 wherein:

the first and second metal material comprises tin.

17. A snap in duplex electrical connector assembly as in claim as in claim 13 wherein:

the first and second metal material has a thickness ranging between 0.00015 and 0.00030 inches or between 0.0381 and 0.0762 millimeters.

18. A snap in electrical connector assembly comprising:

a connector body having an inlet end portion and an outlet end portion;

a sloping surface formed on said outlet end portion;

a retaining lug formed on said sloping surface;

a stop flange adjacent said sloping surface;

a frustro-conical outer retainer made of spring steel having a central opening, a retaining slot, and a plurality of locking tangs, wherein said frustro-conical outer retainer is placed on said sloping surface and the retaining slot is placed over said retaining lug holding said frustro-conical outer retainer onto the outlet end portion;

a first plating comprising tin placed on the spring steel of said frustro-conical outer retainer;

a bore formed in the inlet end portion of said connector body;

a cable retainer made of spring steel inserted into said bore;

forwardly inclined retaining tangs formed in said cable retainer; and a second plating comprising tin placed on the spring steel of said cable retainer and said forwardly inclined retaining tangs, whereby the snap in electrical connector assembly has an improved conductivity and continuity.

* * * * *